(12) United States Patent
Raiteri et al.

(10) Patent No.: US 12,212,366 B2
(45) Date of Patent: Jan. 28, 2025

(54) OPTICAL COMMUNICATION TRANSMITTER AND RECEIVER WITH MISALIGNMENT MEASUREMENT AND CORRECTION

(71) Applicant: AIRCISION B.V., Eindhoven (NL)

(72) Inventors: Daniele Raiteri, Eindhoven (NL); John J. E. Reid, Eindhoven (NL); Bas Van Der Wielen, Eindhoven (NL)

(73) Assignee: AIRCISION B.V., Eindhoven (NL)

( * ) Notice: Subject to any disclaimer, the term of this patent is extended or adjusted under 35 U.S.C. 154(b) by 0 days.

(21) Appl. No.: 18/395,688

(22) Filed: Dec. 25, 2023

(65) Prior Publication Data

US 2024/0162990 A1  May 16, 2024

Related U.S. Application Data

(63) Continuation of application No. PCT/IB2022/055965, filed on Jun. 28, 2022.

(30) Foreign Application Priority Data

Jun. 28, 2021 (NL) .................................. 2028561

(51) Int. Cl.
*H04B 10/516* (2013.01)
*H04B 10/67* (2013.01)

(52) U.S. Cl.
CPC ......... *H04B 10/516* (2013.01); *H04B 10/676* (2013.01)

(58) Field of Classification Search
CPC ........................... H04B 10/516; H04B 10/676
(Continued)

(56) References Cited

U.S. PATENT DOCUMENTS 9,998,217 B2 * 6/2018 Li ...................... H04B 10/1125
2003/0090765 A1 * 5/2003 Neff ................... H04B 10/1127
398/126
(Continued)

FOREIGN PATENT DOCUMENTS

CA      3062056 A1 * 12/2018 .............. F41A 33/00
CA      2941745 C  *  1/2019 ............. H04B 10/11
(Continued)

OTHER PUBLICATIONS

Boroson et al; MLCD: Overview of NASA's Mars Laser Communications Demonstration System; 2004; Proceedings of SPIE vol. 5338; pp. 1-13. (Year: 2004).*
(Continued)

*Primary Examiner* — Amritbir K Sandhu
(74) *Attorney, Agent, or Firm* — The Roy Gross Law Firm, LLC; Roy Gross

(57) ABSTRACT

FSO systems rely on line-of-sight, and thus can be easily impaired due to disruptions such as atmospheric turbulence. There is a need for a more robust communication system allowing longer distances to be bridged and/or downtime to be reduced.
An optical transmitter is provided generating at least one optical alignment beam. The transmitter comprises at least one alignment modulator, to modulate the alignment beam with transmitter directional data. A suitable receiver may demodulate this information and use the directional data from the transmitter to simplify the attainment and/or maintenance of a sufficient degree of alignment.
Additionally or alternatively, the at least one alignment beam may be used to detect, characterize and/or monitor one or more environmental parameters.

18 Claims, 13 Drawing Sheets

(58) Field of Classification Search
USPC .......................................................... 398/183
See application file for complete search history.

(56) References Cited

U.S. PATENT DOCUMENTS

| | | | | |
|---|---|---|---|---|
| 2012/0308239 | A1* | 12/2012 | Sheth | H04B 10/1125 398/131 |
| 2014/0241731 | A1* | 8/2014 | Peach | H04B 10/11 398/139 |
| 2016/0072580 | A1* | 3/2016 | Wabnig | H04L 9/0852 398/131 |
| 2016/0087722 | A1* | 3/2016 | Wabnig | H04B 10/1143 398/131 |
| 2016/0165325 | A1* | 6/2016 | Coleman | H04B 10/503 398/45 |
| 2018/0088280 | A1* | 3/2018 | Kim | H04B 10/1129 |
| 2020/0119811 | A1* | 4/2020 | Kay | H04B 7/18541 |

FOREIGN PATENT DOCUMENTS

| | | | | |
|---|---|---|---|---|
| EP | 3860000 | A1 * | 8/2021 | |
| EP | 3934129 | A1 * | 1/2022 | ............... H01Q 1/44 |
| WO | WO-2009096927 | A1 * | 8/2009 | ......... G02B 26/0875 |
| WO | WO-2012109248 | A1 * | 8/2012 | ......... H04B 10/1123 |
| WO | WO-2020128432 | A1 * | 6/2020 | ......... G02B 26/0825 |
| WO | WO-2023275722 | A1 * | 1/2023 | ........... H04B 10/112 |

OTHER PUBLICATIONS

Abadi et al; space division multiplexed free space-optical communication system that can auto-locate and fully self align with a remote transceiver ; 2019; Nature.com/scientific reports; pp. 1-8. (Year: 2019).*

* cited by examiner

OPTICAL COMMUNICATION TRANSMITTER AND RECEIVER WITH MISALIGNMENT MEASUREMENT AND CORRECTION

This application is a Track One continuation of No. PCT/IB2022/055965 having International filing date of Jun. 28, 2022, which claims the benefit of priority of NL Patent Application No. 2028561, filed Jun. 28, 2021, the contents of which are all incorporated herein by reference in their entirety.

FIELD

The present disclosure relates to an optical communication transmitter for producing an optical communications beam and a corresponding receiver. In particular, it relates to a communication system comprising an optical communication transmitter and a communication receiver making use of such a beam. It relates to an optical communication receiver for receiving an optical communications beam, and also to methods of aligning such an optical communication system.

BACKGROUND

Communication involves the transfer of data/information between two points using optical radiation through a channel. More particularly, Free Space Optical (FSO) communication, also called free-space photonics (FSP), refers to the transmission of modulated visible or infrared beams through the atmosphere to obtain broadband communications. Most frequently, laser beams are used, although non-lasing sources such as light-emitting diodes or IR-emitting diodes will serve the purpose if allowed by the distance that needs to be covered. Such systems are likely to be required for the upcoming 5G market, and allow a relatively inexpensive expansion of an existing telecommunications network.

Although FSO has a number of significant advantages and attractive use cases, its reliance on line-of-sight-technology means that it can be easily impaired due to disruptions in the FSO communication channel such as atmospheric turbulence. This turbulence is frequently caused by localized changes of refractive indexes due to variations in one or more environmental parameters, such as wind velocity or humidity. This affects the pointing of the one or more transmitting beams between the transmitter and receiver since every time the beam crosses the interface between two areas with different refractive index it slightly changes its direction.

It is an object of this disclosure to provide an improved beam communication system—there is a need for a more robust communication system allowing longer distances to be bridged and/or downtime to be reduced. In particular, this object provides an improved beam system for FSO applications.

GENERAL STATEMENTS

According to a first aspect of the present disclosure, there is provided an optical communication transmitter for producing at least one optical communications beam;
the at least one optical communication transmitter comprising: a first communications radiation source, configured and arranged to provide at least one first optical communications beam; at least one first alignment radiation source, configured and arranged to provide at least one first optical alignment beam; at least one alignment modulator, configured and arranged to receive data and to vary one or more properties of the at least one first optical alignment beam corresponding to data to be communicated; and a transmitter directional controller, configured and arranged to determine at least one pointing direction of the at least one first optical communications beam and/or of the at least one first optical alignment beam, to convert the at least one pointing direction to transmitter directional data, and to provide the transmitter directional data to the at least one alignment modulator; whereby, in use, data is encoded in the first optical alignment beam by the alignment modulator, the data including transmitter directional data.

By modulating one or more transmitted beam to transmit alignment-related data to a receiver, and configuring a receiver to demodulate and extract the alignment-related data, the attainment and/or maintenance of a sufficient degree of alignment may be simplified.

Additionally or alternatively, the at least one alignment beam and/or at least one communications beam may be used to detect, characterize and/or monitor one or more environmental parameters.

According to a further aspect of this disclosure, the optical communication transmitter further comprises: one or more variable optical elements, configured and arranged to vary one or more directional properties of the at least one first optical communications beam and/or of the at least one first optical alignment beam upon receipt of one or more configuration parameters; wherein the transmitter directional controller is further configured and arranged to convert the at least one pointing direction to one or more optical configuration parameters, and to provide the one or more configuration parameters to the one or more variable optical elements.

Optionally, the one or more variable optical elements are comprised in an optical aligner, configured and arranged to vary one or more directional properties of the at least one first optical communications beam and/or of the at least one first optical alignment beam.

Optionally, the one or more directional properties of the at least one first optical communications beam and/or of the at least one first optical alignment beam are selected from the group comprising: a beam angle, a beam width, a degree of collimation, a degree of divergence, a beam direction, a field-of-view, an intensity distribution in a radial cross-section, or any combination thereof.

According to yet another aspect of the current disclosure, at least part of the transmitter directional data corresponds to one or more properties of the at least one first optical communications beam and/or of the at least one first optical alignment beam selected from the group comprising: at least one transmitter pointing direction, a beam angle, a beam width, a degree of collimation, a degree of divergence, a field-of-view, an intensity distribution in a radial cross-section, a total beam power, a laser wavelength, a laser line width, an optical amplifier power, a beam quality or any combination thereof.

Optionally, at least part of the transmitter directional data corresponds to one or more co-ordinates, associated with a location of the transmitter and/or one or more receivers, selected from the group comprising: a geographic co-ordinate, a longitude, a latitude, a radionavigation co-ordinate, a satellite-based co-ordinate, a GPS co-ordinate, a GLONASS co-ordinate, a Galileo co-ordinate, a BeiDou co-ordinate, a NAVIC, a QZSS co-ordinate, a WiFi network ID, a mobile phone cell tower ID, a radio beacon, a Bluetooth beacon, or any combination thereof.

Optionally, at least part of the transmitter directional data corresponds to one or more parameters selected from the group comprising: an optical configuration parameter for the transmitter, a configuration parameter for a variable optical element comprised in the transmitter, atmospheric data associated with a location of the transmitter, positional and/or movement data from a positional sensor associated with a location of the transmitter, atmospheric data associated with a location through which the communication channel passes, an optical configuration parameter for a receiver, a configuration parameter for a variable optical element comprised in a receiver, atmospheric data associated with a location of a receiver, positional and/or movement data from a positional sensor associated with a location of a receiver, or any combination thereof.

According to a still further aspect of the present disclosure, the optical transmitter is configured and arranged to provide at least one first optical communications beam and/or at least one first optical alignment beam having a central wavelength in the range of 1260 to 1360 nm, or in the range of 1530 to 1565 nm, or in the range 1565 to 1625 nm.

These represent respectively the O-band, C-band and L-band for optical communication which have been found to have a relatively low absorption by atmospheric air, which may be particularly advantageous for FSO.

According to a still further aspect of this present disclosure, the optical communication transmitter further comprises: a communications modulator, configured and arranged to receive data and to vary one or more properties of the optical communications beam corresponding to data to be communicated; a transmitter data controller, configured and arranged to receive information to be communicated to convert the information to communication data, and to provide the communication data to the communications modulator; wherein the transmitter directional controller is further configured and arranged to provide directional data to the communications modulator; whereby, in use, data is encoded in the first optical communications beam by the communications modulator, the data including communication data and transmitter directional data.

It may be advantageous to encode data in the at least one communications beam corresponding to one or more alignment-related characteristic of the same beam and/or another beam emitted by the transmitter. This may be particularly advantageous if the transmitter is configured and arranged to emit one or more communications beams This may also be particularly advantageous if the at least one alignment beam is not available.

According to a still further aspect of the present disclosure, the optical communication transmitter is configured and arranged to direct the at least one first optical communications beam and/or the at least one first optical alignment beam through a communication channel comprising one or more of: space sections, atmospheric sections, or any combination thereof, suitable for use by a Free Space Optic (FSO) or Free Space Photonics (FSP) system.

According to another aspect of the current disclosure, the optical communication transmitter further comprises: at least one communications modulator, configured and arranged to receive data and to vary one or more properties of the at least one optical communications beam corresponding to data to be communicated; a transmitter data controller, configured and arranged to receive information to be communicated, to convert the information to communication data, and to provide the communication data to the at least one communications modulator; wherein the transmitter directional controller is further configured and arranged to provide directional data to the at least one communications modulator; whereby, in use, data is encoded in the at least one first optical communications beam by the at least one communications modulator, the data including communication data and transmitter directional data.

According to a still further aspect of the disclosure, an optical communication receiver is provided for receiving at least one first optical communications beam and for further receiving at least one first optical alignment beam comprising data to be decoded by demodulation, the data including transmitter directional data; wherein the receiver comprises: one or more radiation detectors, configured and arranged to measure at least one characteristic of the at least one first optical communications beam and/or at least one first optical alignment beam; at least one demodulator, connected electrically to the one or more radiation detectors, configured and arranged to at least partially retrieve the transmitter directional data encoded in the at least one optical alignment beam; and a receiver directional controller, configured and arranged to receive transmitter directional data from the at least one demodulator and to receive measurement data from the one or more radiation detectors associated with the at least one beam characteristic; wherein the transmitter directional data comprises predictive data associated with the one or more beam characteristic; and wherein the receiver directional controller is further configured and arranged to determine one or more differences between the predictive beam data and the receiver measurement data.

For example, the at least one beam characteristic is at least one receiving beam directional property of the at least one first optical communications beam and/or the at least one first optical alignment beam; wherein the receiver directional controller is further configured and arranged to determine a degree of beam misalignment based on the one or more differences between the predictive beam data and the receiver measurement data.

It may be advantageous where the at least one receiving beam directional properties corresponds to one or more properties of the at least one first optical communications beam and/or of the at least one first optical alignment beam selected from the group comprising: at least one receiving beam direction, a beam angle, a beam width, a degree of collimation, a degree of divergence, a field-of-view, an intensity distribution in a radial cross-section, a total beam power, a laser wavelength, a laser line width, an optical amplifier power, a beam quality or any combination thereof.

According to a further aspect of this disclosure, an optical receiver is provided wherein the at least one beam characteristic is associated with a perturbation in the at least one first optical communications beam and/or the at least one first optical alignment beam due to one or more environmental parameters in the communication channel between the receiver and the source of the at least one first optical communications beam and/or the source of the at least one first optical alignment beam.

For example, the at least one beam characteristic is associated with an atmospheric turbulence, a wind velocity, a humidity, an air pressure, an air flow, a temperature, a precipitation, a weather parameter, or any combination thereof.

For example, the at least one beam characteristic is associated with a twist and/or sway of the receiver, of the source of the at least one first optical communications beam of the source of the at least one first optical alignment beam, or any combination thereof.

According to a still further aspect of the disclosure, the receiver is further configured and arranged: to measure an energy at a plurality of points within at least a portion of the at least one first optical communications beam and/or of the at least one first optical alignment beam; to estimate the position of a transverse cross-sectional center of the at least one first optical communications beam and/or of the at least one first optical alignment beam; and to provide the position of a transverse cross-sectional center as the receiver measurement data to the receiver directional controller for determining a degree of beam misalignment.

According to yet another aspect of this disclosure, the receiver is further configured and arranged: to measure an energy at a plurality of points within at least a portion of the at least one first optical communications beam and/or of the at least one first optical alignment beam; to estimate an angle of the at least one first optical communications beam and/or of the at least one first optical alignment beam; and to provide the angle as the receiver measurement data to the receiver directional controller for determining a degree of beam misalignment.

According to yet another aspect of the present disclosure, an optical receiver comprising: two or more alignment detectors, disposed at different positions along a receiver optical axis; wherein the two or more alignment detectors are configured and arranged such that comparison of the radiation measurements at each of these two or more detectors indicates a beam direction and/or a beam angle associated with at least one first optical communications beam and/or at least one first optical alignment beam.

The communication receiver further a communications demodulator, connected electrically to the one or more radiation detectors, configured and arranged to at least partially retrieve data encoded in the communication beam by the communications modulator of the transmitter.

Optionally, the first alignment detector comprises one or more radiation detectors disposed proximate an aperture or radiation window.

This may allow radiation detection when the misalignment is relatively high, particularly in situations where the amount of energy entering the aperture is relatively low.

According to a further aspect of the current disclosure, a method of aligning an optical communication system is provided, comprising: providing a transmitter, configured and arranged to measure movement of the transmitter after mounting; mechanically mounting the transmitter at a Tx location to a first suitable structure; providing a receiver, configured and arranged to measure movement of the receiver after mounting; mechanically mounting a receiver at an Rx location to a second suitable structure, wherein the transmitter and receiver are separated by a communication channel; measuring a degree of predicted misalignment of the transmitter using the movement measurements of the transmitter: and measuring a degree of predicted misalignment of the receiver using the movement measurements of the receiver.

According to a still further aspect of the current disclosure, a communication system is provided comprising: an optical transmitter as disclosed herein, configured and arranged to produce at least one first optical communications beam and a at least one first optical alignment beam; and one or more communication receivers as disclosed herein, configured and arranged to receive at least a portion of the at least one first optical communications beam and/or of the at least one first optical alignment beam produced by the optical transmitter.

According to a still further aspect of the current disclosure a communication station is provided comprising: a first optical transmitter as disclosed herein, configured and arranged to produce at least one first optical communications beam and a at least one first optical alignment beam, and a communication receiver as disclosed herein, configured and arranged to receive at least a portion of at least one second optical communications beam and/or at least one second optical alignment beam produced by a second optical transmitter as disclosed herein.

Optionally, the communication system comprises a further communication station comprising: the second optical transmitter, configured and arranged to produce the at least one second optical communications beam and the at least one second optical alignment beam, and the second communication receiver, configured and arranged to receive at least a portion of the at least one first optical communications beam and/or the at least one first optical alignment beam produced by the first optical transmitter.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein.

DETAILED DESCRIPTION

In the following detailed description, numerous non-limiting specific details are given to assist in understanding this disclosure. It will be obvious to a person skilled in the art that the software methods may be implemented on any type of suitable controllers, memory elements, and/or computer processors.

Tx/Rx are used respectively as abbreviations for transmitter/receiver.

Figure 1A:
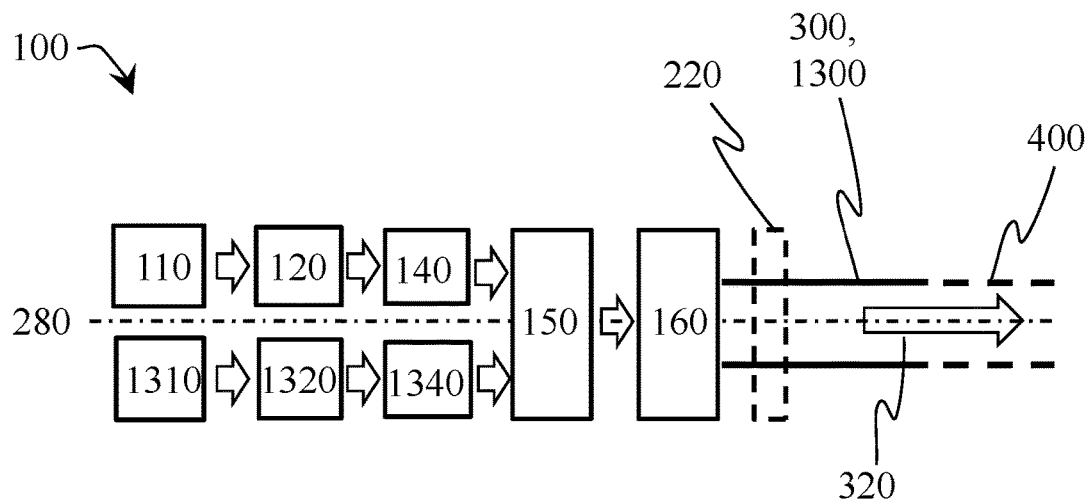
FIG. 1A schematically depicts an optical communication transmitter for producing one or more transmitting optical beams.
Figure 5A:
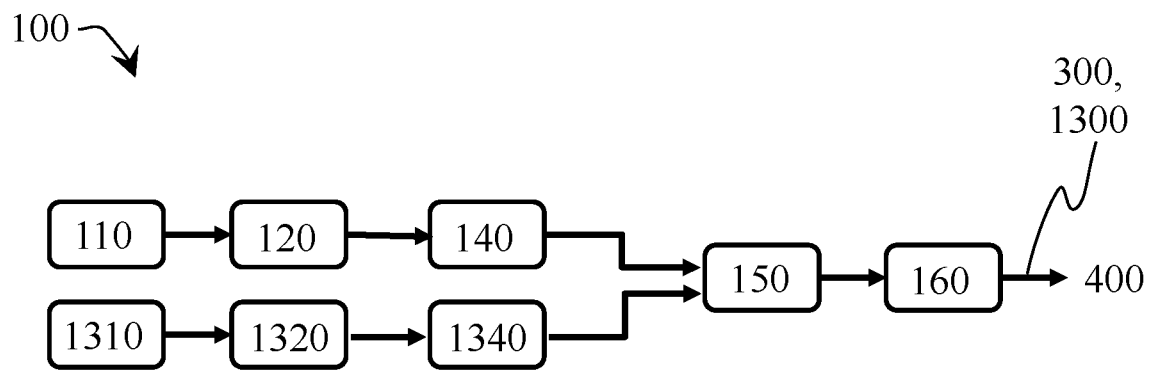
FIG. 5A depicts functionalities which may be comprised in an optical communication transmitter.

FIG. 1A schematically depicts an improved optical communication transmitter (Tx) 100, configured and arranged to produce at least one transmitting optical communications beam 300 and/or at least one transmitting optical alignment beam 1300 (or one or more transmitting beams) 300, 1300. FIG. 5A depicts the functionalities which may be comprised in such a communication transmitter (Tx) 100. The figures are schematic—unless specified otherwise, one or more modules/elements/components/functionalities:

may be provided at any suitable position along a Tx optical axis 280; and/or
  may be combined; and/or
  may be distributed over a plurality of instances; and/or
  may be disposed off-axis.

Many configurations of beams are possible—in general, the phrase "transmitting beams" should be understood as one or more transmitting beams 300, 1300 comprising at least one transmitting optical communications beam 300 and/or at least one transmitting optical alignment beam 1300.

The optical communication transmitter 100 is configured and arranged to provide an optical communications system which may be reliably used for distances from 500 meters to 2.5 km. Certain configurations may also be used with distances of up to 5 to 10 km—such distances may be advantageously used within a telecommunications network, such as 5G, for the last mile. With a high enough energy of laser, communication may be made over considerably larger distances, such as up to 40 km or beyond More particularly, the optical system transmitter 100 of FIG. 1A comprises:

(a) a Tx optical axis 280;
(b) an electromagnetic radiation source 110 (or radiation source), suitable for communicating data, such as a laser source. It may be configured to provide at least one optical communications beam 300 substantially along the Tx optical axis 280. It may be advantageous to provide an optical communications beam 300 which is substantially coherent.

Various communication laser/modulation configurations may be used including the use of fiber lasers or solid-state lasers. Suitability of the radiation source 110 for communications includes consideration of one or more of the following parameters:

sufficient energy to provide a detectable and interpretable beam at the required distance and required bit rate,
  suitable energy and wavelengths to accurately and reliably traverse the communication channel 400, such as atmosphere and/or space.

Optionally, an amplifier or booster may also be comprised in the optical transmitter 100 to boost the signal to required energy levels. Additionally or alternatively, an amplifier may be comprised in the communication radiation source 110—for example, an Erbium-doped fiber amplifier may be suitable—this is a booster which may be configured and arranged to provide a high saturated output energy. However, any convenient integration with a suitable optical component may be used, or a separate amplifier/booster module may be provided at a convenient point along the optical axis 280.

It may also be advantageous to provide more than one communications beam 300—for example, two or more communications beams 300 may be provided using one communications radiation source 110. Additionally or alternatively, the transmitter may comprise more than one communication radiation source 110.

For example, the transmitter 100 may be configured and arranged to provide multiple (or overlapping) communications beams 300 using a techniques such as Wavelength Division Multiplexing (WDM) and/or dual polarization.

For reliable FSO operation under various atmospheric conditions, such as precipitation and light fog, 100-500 mW may be suitable. For most FSO applications, a minimum of 100 mW is typically used. However, power of several watts (for example, up to 10 W) may be preferred to communicate over longer distances, such as those used for space communications.

For example, the following may be considered for a communications source 110:

(1) A He—Ne laser, with 100 mW of power, with a central wavelength of 632.8 nm. A Gaussian profile may simplify the configuration and arrangement of the downstream optical components, and may provide a more predictable and reproducible operation.
(2) a laser with a frequency in the O-band range of 1260 to 1360 nm.
(3) a CW (Continuous Wave) semiconductor laser may be used, with a power of 100 mW (20 dBm) and a central wavelength of 1550 nm. This wavelength may be particularly suitable for FSO communication as it lies in the C-band optical communication range of 1530 to 1565 nm.
(3) a laser with a frequency in the L-band range of 1565 to 1625 nm may also be advantageously used for FSO.
(4) a fiber laser Similarly, an O-band radiation source may also be advantageous, with a central wavelength in the range of 1260 to 1360 nm.

Many of the most suitable radiation sources 110 for communications emit radiation as a strongly diverging beam, sometimes over several degrees (e.g. 8-10 degrees). In many cases, the beam width may be only a few microns. So a communications beam conditioner 140 may be advantageous when using such a radiation source 110—this may be disposed at a suitable position in the optical path.

Additionally or alternatively, a beam conditioner 140 may be comprised in the communication radiation source 110.

A communications beam conditioner 140 may comprise one or more optical elements, such as one or more lenses. For example, if a fiber laser radiation source 110 is used, it may be sufficient to comprise one lens in the beam conditioner 140. For other radiation sources, a more extensive beam conditioner 140 may be used.

The optical system transmitter 100 of FIG. 1A further comprises:

(c) a communications modulator 120, configured and arranged to receive data and to vary one or more properties of the optical communications beam 300 corresponding to data to be communicated (or information). In general, any convenient integration with a suitable optical component may be used, or a separate communications modulator module (as depicted in FIG. 1A) may be disposed at any suitable position along the optical axis 280.

Additionally or alternatively, the communications modulator 120 may be comprised in the communication radiation source 110—this may be advantageous for high-speed communications as electro-optic modulators, such as lithium niobite modulators, allow the radiation source 110 to be modulated directly.

For some communication systems, a communications source 110 may be preferred which allows modulation protocols to be applied directly to allow a relatively high-rate of data transfer. For example, a minimum bit rate of 2.5 Gbps, more preferably 5 Gbps, even more preferably 10 Gbps is particularly advantageous for communication of data.

Any suitable modulation protocol and configuration may be used. For example: RZ (or RTZ or Return-to-Zero) or OOK (On-Off Keying) are relatively simple to implement, although variations of PSK (Phase-Shift Keying) and NRZ (Non-Return-to-Zero) are also suitable.

Coherent formats may be used, such as QPSK or n-QAM. Pulse Position Modulation (PPM), which is often used for deep space communication, may also be advantageous.

Additionally or alternatively, different polarization states may also be used. If a pulsed radiation source 110 is used, laser pulse pickers or pulse gating may be used.

Optionally, the bit stream supplied to the communications modulator 120 may be framed and/or protected by a suitable ECC (Error Correction Code) coding scheme, such as FEC (Forward Error Correction).

The optical system transmitter 100 of FIG. 1A further comprises (d) an optional beam generator 150, configured and arranged to generate beams suitable for communication. It may be advantageous to modify one or more properties of the beam produced by the radiation source 110 and/or the beam after conditioning by the optional communications beam conditioner 140—the optional beam generator 150 may be configured and arranged to provide such a modification of one or more properties.

If the transmitter 100 is configured and arranged to generate more than one beam, such as one or more communications beam 300 and/or one or more alignment beams 1300, the one or more beams 300, 1300 may be combined at any convenient location along the optical path. For example, as depicted in FIG. 1A, the beam generator 150 may be configured and arranged to combine the one or more communications beam 300 and one or more alignment beams 1300.

The transmitters described in this disclosure may be used with any suitable type of communications beam.

The optical system transmitter 100 of FIG. 1A further comprises:

(e) an electromagnetic radiation source 1310 (or radiation source), suitable for alignment, such as a laser source. It may be configured to provide at least one alignment beam 1300 of radiation substantially along the Tx optical axis 280.

Various alignment laser/modulation configurations may be used including the use of fiber lasers or solid-state lasers In general, the requirements for an alignment beam 1300 are expected to be less than for a communications beam 300, so a lower energy beam and/or lower data rate (for example, kbps instead of Mbps) may be used. Use of a wavelength close to the communications beam 300 may reduce the need for a complex optical design.

It may also be advantageous to provide more than one alignment beam 1300—for example, two or more alignment beams 1300 may be provided using one alignment radiation source 1310. Additionally or alternatively, the transmitter may comprise more than one alignment radiation source 1310.

Similar to communications radiation sources 110, many of the most suitable alignment radiation sources 1310 emit diverging radiation. So a beam conditioner 1340 may be advantageous when using such a radiation source 1310—this may be disposed at a suitable position in the optical path.

Additionally or alternatively, a beam conditioner 1340 may be comprised in the alignment radiation source 1310. An alignment beam conditioner 1340 may comprise one or more optical elements, such as one or more lenses.

(f) an alignment modulator 1320, configured and arranged to receive data and to vary one or more properties of the optical alignment beam 1300 corresponding to data to be communicated (or information). In general, any convenient integration with a suitable optical component may be used, or a separate alignment modulator module (as depicted in FIG. 1A) may be disposed at any suitable position along the optical axis 280.

Additionally or alternatively, the alignment modulator 1320 may be comprised in the alignment radiation source 1310.

Any suitable modulation protocol and configuration may be used.

See FIG. 2A and the associated description below for more details regarding the data which may be applied to the transmitting optical alignment beam 1300 using the alignment modulator 1320, including transmitter directional data 850.

Preferably, the transmitter 100 is configured and arranged to provide the optical communications beam 300 and/or the alignment optical beam 1300 along the transmitter optical axis 280. The at least one optical communications beam 300 and the at least one alignment optical beam 1300 may also be described as co-axial.

It may be advantageous to combine the communications source 110 and alignment source 1310 in fiber. A fiber combiner may be used, based on wavelength and/or polarization, whereby a high degree of co-axiality may be achieved. Differences in size and/or divergence may be provided by exploiting different optical characteristics, such as wavelength differences between the sources and/or different chromatic effects in optical components such as lenses.

Alternatively, the communications source 110 and alignment source 1310 may be combined using, for example, a dichroic mirror or polarization beam splitter (placed at 45°) which reflects one wavelength/polarization and passes another wavelength/polarization. This may be advantageous because optical characteristics may be optimized independently. As depicted in FIG. 1A, the beam generator 150 may be configured and arranged to combine a plurality of beam 300, 1300.

The communication transmitter 100 may further comprise:

(g) an aperture and/or radiation window 220 at the exit of the transmitting beams 300, 1300. The radiation window 220 is typically configured and arranged to allow the transmitting beams 300, 1300 to pass through it, but also to isolate the internal areas from the outer areas.

The optical communications transmitters 100 in FIG. 1A may also comprise:

(h) a Tx optical aligner 160, configured and arranged to receive the single beam or combined beams from the optional beam generator 150, and to direct the at least one transmitting beams 300, 1300 out of the communications transmitter 100 into the channel 400 along the Tx optical axis 280. It may comprise one or more optical elements.

The configuration and arrangement of the Tx optical aligner 160 may be determined by the properties and/or dimensions of the beams from the sources 110, 1310, the optional beam conditioners 140, 1340 the optional beam generator 150, the optional combination of beams by the beam generator 150, and the desired directional properties of the transmitting beams 300, 1300 to be transmitted through the channel 400.

It may be used to perform a coarse alignment, a fine alignment, an initial alignment and/or a degree of continuous alignment. It may also be used to perform fine tuning of one or more directional beam properties before beam transmission, such as beam angle, beam width, collimation and/or beam direction. For example:

by modifying one or more angles of the transmitting beams 300, 1300; and/or by modifying the degree of collimation in the transmitting beams 300, 1300, at least one transmitting communications beams 300 and/or alignment beams 1300 of sufficient width may be produced that will be accurately and reproducibly be received at the receiver 700; and/or by increasing the beam width for transmission, the beam intensity and energy may be distributed over a larger area, so that regulations dealing with eye-safety, for example, are complied with.

In particular, for an FSO system over larger distances, a higher degree of alignment may be required to optimize the reliability and accuracy of communication.

The optional one or more Tx beam conditioners 140, 1340 may provide additional ways of varying one or more directional properties of the beam entering the beam generator 150 and/or optical aligner 160, and therefore provides a more indirect way of varying one or more directional properties of the at least one transmitting communications beams 300 and/or alignment beams 1300.

Figure 2A:
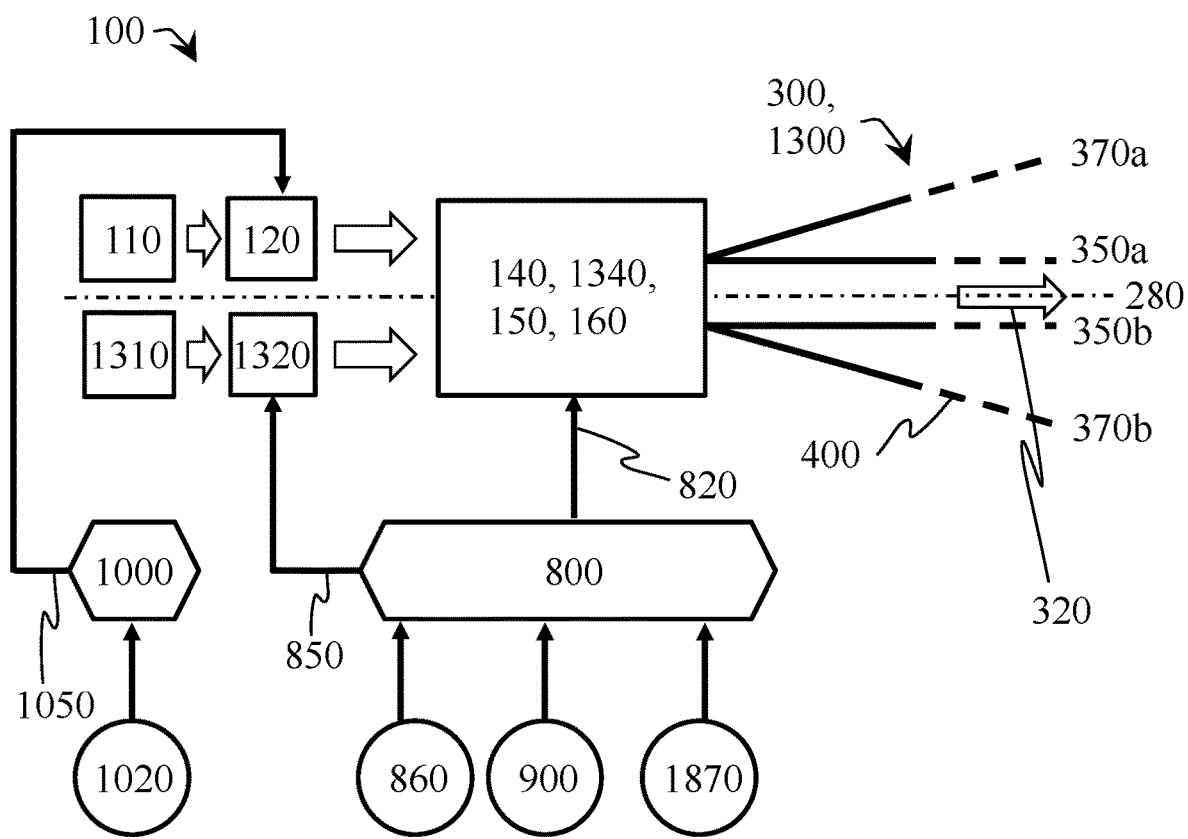
FIG. 2A schematically depicts applying transmitter directional data to a transmitting optical beam.

FIG. 2A schematically depicts applying data to the transmitting optical beams 300, 1300, including Tx directional data 850. It depicts details of the optical communication transmitter 100 depicted in FIG. 1A. For example, FIG. 2A depicts the communications radiation source 110, the communications modulator 120, the alignment radiation source 1310, the alignment modulator 1320, the optional beam conditioners 140, 1340, the optional Tx beam generator 150 and the Tx optical aligner 160, disposed along the Tx optical axis 280.

FIG. 2A further depicts:

a Tx data controller 1000, configured and arranged to receive information to be communicated 1020, to convert the information 1020 to communications data 1050, and to provide the communications data 1050 to the communications modulator 120. In other words, during use for communication, the information 1020 is digitally coded 1050 and used to modulate 120 (or vary) one or more properties of the optical communications beam 300, such as an intensity of the transmitting communication beam 300. The transmitting communication beam 300 may also be described as a data carrier signal;

optionally, one or more variable optical elements (not depicted in FIG. 2A), configured and arranged to vary one or more directional parameters of the transmitting beams 300, 1300 upon receipt of one or more configuration parameters 820. For example, movable, adaptive and/or deformable elements, configured and arranged to vary a Tx pointing direction 320 and/or a transmitting beam divergence 350*ab*, 370*ab*. In this example, the divergence may be predetermined and/or controlled in a range between a high divergence 370*a*, 370*b* and a low divergence 350*a*, 350*b*. The transmitting beams 300, 1300 are considered to have a low divergence 350*a*, 350*b* if the transmitting beams 300, 1300 are approximately parallel to the Tx optical axis 280. The transmitting beams 300, 1300 are considered to have a high divergence 370*a*, 370*b* if the transmitting beams 300, 1300 increase in diameter when moving away from the Tx aperture (not depicted) along the Tx optical axis 280 towards a receiver (not depicted).

The one or more variable optical elements may be disposed in any suitable module and/or disposed at any suitable position on the optical axis 280. Additionally or alternatively, the one or more variable optical elements may be comprised in the Tx optical aligner 160. Additionally or alternatively, the one or more variable optical elements may be comprised in the optional beam generator 150. Additionally or alternatively, the one or more variable optical elements may be comprised in the optional beam conditioners 140, 1340;

The terms "configuration parameter" and "variable optical element" cover many different types of variation and adjustment. In some cases, an infrequent manual adjustment may be sufficient. For others, a more dynamic adjustment may be provided—for example, for a parameter/optical element used in dynamic alignment adjustment, response speeds in the kilohertz range may be required.

FIG. 2A further depicts:

a Tx directional controller 800, configured and arranged:

to determine and/or receive at least one Tx pointing direction 320 of the transmitting communications beam 300 and/or alignment beam 1300. This is at least one nominal or reference pointing direction. In many cases, this is difficult to directly measure—alternatively, it may be inferred and/or deduced from, for example, a current setting of the one or more variable optical elements, historical data, measurement, simulation, estimation, data from one or more radiation sensors, or any combination thereof;

convert the at least one Tx pointing direction 320 to Tx directional data 850, and to provide the Tx directional data 850 to the alignment modulator 1320.

In other words, the Tx directional data 850 is digitally coded 850 and used to modulate 1320 (or vary) one or more properties of the optical alignment beam 1300, such as an intensity of the transmitting alignment beam 1300. The Tx directional data 850 may thus be transmitted when the at least one alignment beam 1300 is transmitted, such as during an alignment procedure and/or communications use.

In this embodiment with co-axial output beams, the transmitting communications beam 300 is a data carrier signal. The transmitting alignment beam 1300 may be described as a beacon signal.

The transmitter 100 may operate in at least three basic transmitting modes:
1) transmission of at least one alignment beam 1300 and at least one communications beam 300. Advantageously, this is used during communications operations to attain and/or maintain a sufficient degree of alignment. Additionally or alternatively, at least one alignment beam 1300 and/or at least one communications beam 300 may be used to detect, characterize and/or monitor one or more environmental parameter;
2) transmission of at least one communications beam 300. If the degree of alignment is sufficient, the at least one alignment beam 1300 may be turned off. Optionally, this may be during communications operation for short periods where the expectation is that a sufficient degree of alignment is expected (or predicted) to be maintained. Additionally or alternatively, this mode may be used during an initial and/or an operational alignment procedure; or
3) transmission of at least one alignment beam 1300. This mode may be used during an initial and/or an operational alignment procedure. Additionally or alternatively, at least one alignment beam 1300 and/or at least one communications beam 300 may be used to detect, characterize and/or monitor one or more environmental parameter.

The at least one Tx pointing direction 320 may correspond to one or more directional characteristic of:
the at least one alignment beam 1300 and/or
the at least one communications beam 300.

In other words, the data encoded 850 in the at least one alignment beam 1300 may correspond to one or more directional characteristic of the same beam and/or another beam emitted by the transmitter.

The data encoded 850 may correspond to one or more directional characteristics of a beam being emitted and/or an expected (or predicted) directional characteristic of a beam not being emitted.

One of the insights upon which the invention is at least partially based is to transmit a laser beam in a certain direction and to modulate information on that beam that is relevant for the receiver 700 to attain and/or maintain a sufficient degree of alignment. As described below, this information may include static and/or dynamic values, such as: the transmitter GPS coordinates, the transmitter orientation (obtained from Tx positional and/or movement data 900) and one or more beam properties such as pointing direction, transmitted power, beam width and divergence.

In general, directional data may comprise any data considered relevant for the alignment and/or satisfactory operation of the transmitter and/or receiver. The categories used in this disclosure are selected to illustrate the different categories of data which may be available and considered. Depending on the type of installation, an accurate and reliable operation may be provided with a small selection of parameters. In some cases, it may be advantageous to provide a large number of parameters. Other categories may also be considered.

The type of data considered under each category may also depend on the type of installation. For example, where a transmitter and/or receiver are mounted to a building, positional data may be relatively static and movement data may be relatively small in value. For example, where a transmitter and/or receiver are mounted to a tower, positional data may be relatively static and movement data may be increased compared to the building values. For example, where a transmitter and/or receiver are mounted to a moving object, such as a vehicle, positional data may be relatively dynamic and movement data may be much higher than in the building or tower installations.

A suitable receiver (not depicted but described in more detail below) may receive at least a portion of the transmitted beam, and determine and/or receive at least one Rx pointing direction of the receiving communications beam and/or alignment beam. This is at least one nominal or reference pointing direction, and may be determined using at least one measurement from one or more radiation sensors to determine at least one position, angle and/or intensity. Optionally, the Rx pointing direction may be further inferred and/or deduced from, for example, a current setting of one or more variable optical elements in the receiver, historical data, measurement, simulation, estimation, or any combination thereof.

The suitable receiver may then compare the expected Rx pointing direction (determined using the transmitter information demodulated from the transmitted beam) with the Rx pointing direction determined using at least one measurement.

Differences may be related to one or more environmental parameters in the communication channel 400. After determining a perturbation due to one or more environmental parameters, the receiver may be configured and arranged to compensate, such as by
  adjusting one- or more closed-loop control parameters such as bandwidth;
  varying one or more variable optical elements in the receiver;
  providing Rx feedback 1870 to the transmitter 100 if a Rx to Tx data channel is provided. For example, an external network may be used. Preferably, a second transmitter and a second receiver are provided in a duplex communication configuration (as described below). This Rx feedback 1870 may be used by the Tx directional controller 800 to vary one or more Tx optical configuration parameters 820 whereby one or more Tx pointing directions 320 are also varied; and/or
  relaying a message to the link/network operator that link loss is expected in case that heavy perturbations occur that cannot be corrected.

Additionally, a co-axiality error may also be determined by measuring the alignment of at least two beams at the receiver 700 and comparing alignment values with one or more TX pointing directions 320. A measured offset may be dynamic, static, or a combination thereof. If an offset is dynamic, it suggests that the wavelengths of the beams have propagated differently through the atmosphere.

If an offset is static, or approximately static), it suggests a co-axiality issue between the two or more beams. This co-axiality error may be reduced, or calibrated out, by modifying one or more RX configuration parameters. Additionally or alternatively, one or more offsets may be applied to at least partially compensate for co-axiality errors.

Additionally or alternatively, if one or more Rx feedback channels are provided, such as an Rx to Tx data channel, the transmitter may provide an instruction and/or request to modify one or more Tx configuration parameters. For example, one or more parameters to activate or modify an actuator to correct the co-axiality.

Detection and/or correction of co-axiality errors may be advantageous at it may the relaxation of manufacturing tolerances.

Optionally, the Tx directional controller 800 may be configured and arranged to determine one or more optical configuration parameters 820, and to provide the one or more configuration parameters 820 to the one or more variable Tx optical elements. As depicted, the one or more variable optical elements may be disposed in the optional beam conditioners 140, 1340, the optional beam generator 150 and/or the Tx optical aligner 160. Preferably, at least one variable optical element is comprised in the Tx optical aligner 160.

Optionally, the at least one Tx pointing direction 320 may vary due to the execution of an alignment procedure, such as: link acquisition, closed loop tracking, and holding last known position.

Optionally, the at least one pointing direction 320 may vary due to the directional controller 800 receiving Tx atmospheric data 860, and may use this data to influence the generation of the one or more Tx optical configuration parameters 820 and/or the Tx directional data 850.

Optionally, the at least one Tx pointing direction 320 may vary due to the Tx directional controller 800 receiving Tx positional and/or movement data 900, and may use this data to influence the generation of the one or more Tx optical configuration parameters 820 and/or the Tx directional data 850.

Figure 7A:
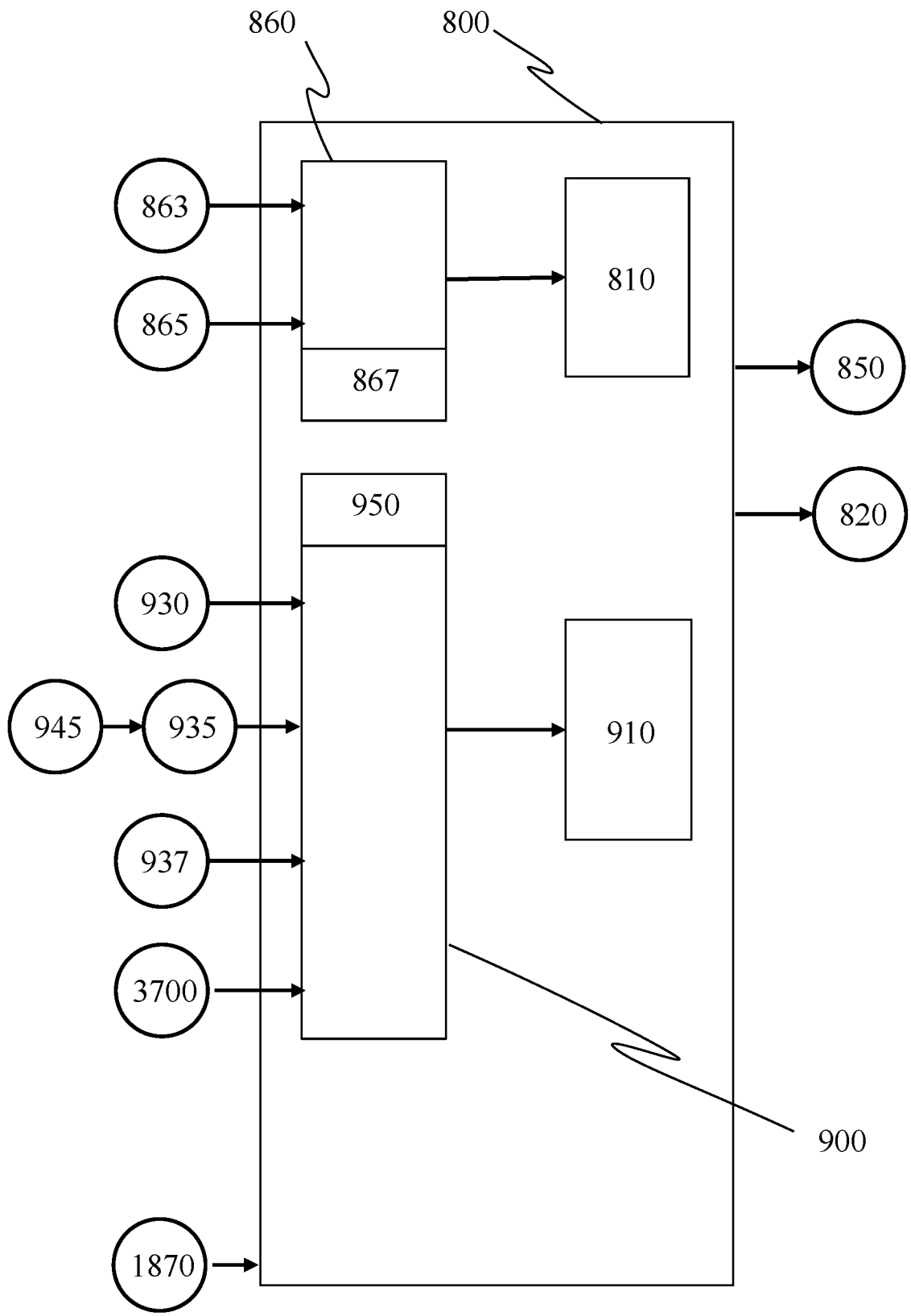
FIG. 7A depicts a schematic overview of inputs and outputs which may be used by a transmitter directional controller.

FIG. 7A depicts a schematic overview of one or more inputs which may be used by the Tx directional controller 800 depicted in FIG. 2A. Inputs are indicated on the left hand-side, and possible outputs on the right-hand side.

The Tx directional controller 800 may determine and output the Tx directional data 850 and/or one or more Tx optical configuration parameters 820. One or more inputs may be used in the determination—in the example depicted, the inputs are divided into one or more functional groups. The Tx directional controller 800 may comprise one or more estimator functions. The categorization of inputs is done mainly to assist in the explanation, and are provided as non-limiting examples. Alternative inputs may be considered that provide similar or equivalent data. In some cases, inputs may be ignored as having a negligible effect. Some inputs may also be considered as belonging to a different functional group, or more than one functional group.

The main input functions depicted are:
receiving Tx atmospheric data 860, comprising real-time weather data 863 and/or forecast weather data 865;
receiving Tx positional and/or movement data 900 comprising Tx positional data 930, Tx movement data 935 (including data from one or more Tx movement sensors 945), and/or forecast Tx movement data 937;
optionally receiving at least one Tx pointing direction 320. Additionally or alternatively, the Tx directional controller 800 may be configured and arranged to determine at least one Tx pointing direction 320; and
optionally, Rx feedback data 1870. provided via an optional Rx to Tx data channel.

For example, as depicted, a Tx turbulence estimator 810 may be optionally provided, configured and arranged to estimate turbulence strength and a degree of influence on the communication channel 400, such as an FSO channel, based on weather parameters relevant for the Tx turbulence estimator 810. This Tx atmospheric data 860 may include:
a value of temperature, humidity, air pressure and wind speed;
a value of: air temperature, ground temperature, surface temperature, roof temperature, dew point, water vapor, wind direction, wind velocity, atmospheric pressure, air flow, precipitation composition, precipitation distribution, pollution composition, pollution distribution, cloud composition, cloud distribution, fog composition, fog distribution, visibility, radiation penetration, radiation scattering, radiation dispersion, radiation absorption, solar radiation, solar radiation distribution, solar radiation reflection, or any combination thereof;
a value for one or more locations and/or altitudes;
a value of time, day, date, month, year, or any combination thereof;
a value measured in real-time, provided as real-time weather data 863;
a value forecasted or predicted, provided as forecast weather data 865. Additionally or alternatively, the transmitter 100 may be configured and arranged to forecast or predict one or more values to be provided as forecast weather data 865;
historical values, provided as historical weather data 867. Additionally or alternatively, historical weather data 867 may be stored in the transmitter 100. Additionally or alternatively, the transmitter 100 may be configured and arranged to generate one or more values to be provided as historical weather data 867;
one or more inputs to the Tx direction controller 800 provided for the Tx positional and/or movement estimator 910 described below;
or any combination thereof.

It may also be advantageous to perform one or more measurements directly, such as by using a scintillometer, anemometer or sonic anemometer.

In the case of an FSO channel 400, the transmitting beams 300, 1300 may be subject to atmospheric turbulence which may result in signal fade and potential packet loss. Atmospheric turbulence is expected to cause three main problems with the receiving beams 500, 1500: beam wander, beam scintillation, and beam spreading.

Many configurations of beams are possible—in general, the phrase "receiving beams" should be understood as one or more receiving beams 500, 1500 comprising at least one receiving optical communications beam 500 and/or at least one receiving optical alignment beam 1500.

Beam wander may result in a displacement of the center of the receiving beams at the receiver and/or an angular deviation. Beam wander is expected to be typically a lower frequency effect (less than 1 kHz) which may result in angle-of-arrival (AoA) variations at the receiver side, which may be at least partially compensated and/or decreased by modifying one or more directional properties of the transmitting beams 300, 1300, such as a beam angle, a beam width, a collimation and/or a beam direction. Partial compensation and/or decrease may be provided, for example, using one or more variable optical elements (not depicted) comprised in the Tx optical aligner 160. In general, it is expected that the position of the receiving beams may be partially compensated by varying one or more Tx parameters, and AoA deviations may be at least partially compensated by varying one or more Rx parameters. Optionally, little or no compensation may be provided in the receiver, which may cause a degraded signal power at the one or more Rx detectors when an AoA deviation occurs.

Beam spreading may result in less power being received at the receiver. Beam spreading effects may be at least partially compensated by using a radiation source 110, 1310 and/or one or more optical components to provide a lower transmitting beam divergence and/or an increased output energy.

Beam scintillation may cause deformation of the wavefront of the receiving beams. Such wavefront errors may result in local intensity and/or phase changes in the beams received at the receiver—in some cases, particularly at longer communication channel 400 distances, the receiver may not be able to efficiently focus light onto radiation detectors or into a fiber (not depicted). The effects of beam scintillation may be at least partially compensated and/or decreased by increasing a transmitting beam divergence 350*ab*, 370*ab*—for example, using one or more variable optical elements (not depicted) comprised in the Tx optical aligner 160.

Additionally or alternatively, one or more variable optical elements (not depicted) may be used, comprised in the optional Tx beam conditioners 140, 1340. Additionally or alternatively, one or more variable optical elements (not depicted) may be used, comprised in the optional Tx beam generator 150.

Additionally or alternatively, the effects of beam scintillation may be at least partially compensated and/or decreased by increase a receiver aperture (not depicted) and/or by increasing a field-of-view (FOV) parameter (described below). Increasing of a receiver aperture is also called "aperture averaging".

By choosing a larger transmitter divergence and/or larger receiver FOV, the effects of beam scintillations may be decreased during high degrees of turbulence. If a degree of atmospheric turbulence is low, the divergence and/or FOV may be decreased to maximize link margin.

Scintillation and atmospheric attenuation (or fog) are not expected to occur at the same time, so when turbulence is low, fewer pointing errors are expected and a lower beam divergence may be used.

To more efficiently adapt the divergence and/or Field Of View, it may be advantageous to identify different turbulence conditions. Although conventional systems measure received optical signal power, they cannot distinguish between power losses due to atmospheric turbulence and/or due to atmospheric attenuation, such as fog. According to the invention disclosed herein, three techniques may be used to determine a degree to which detected power loss is due to a degree of atmospheric:
  predict and/or measure atmospheric turbulence by considering the main values and parameters such as: temperature, humidity, windspeed and air pressure;
  compare power loss in a communication (or data) beam 300 with a degree of power loss in a beacon (or alignment) channel 1300, which is typically configured to be more divergent for use in alignment procedures. A high degree of divergence may be advantageous as this is usually less sensitive to disruption by a high degree of atmospheric turbulence;
  comparing the received Tx directional data 850 with measured Rx directional data (described below).

A result from one or both techniques may be used to determine one or more Tx optical configuration parameters 820 and/or one or more Rx optical configuration parameters to provide a high degree of correction. It may be advantageous to use mainly historical weather data 867 and/or forecast weather data 865 as that may allow a more predictive correction.

In other words, a degree of turbulence may be estimated using the main environmental parameters: temperature, humidity, air pressure and windspeed—these may be measured in real-time and/or extracted from weather forecast data 865. Preferably, only weather forecast data 865 is used as that reduces the need for real-time measurement.

FIG. 8 depicts examples of sources of environmental disturbances in a communication channel 400 between a transmitter 100 at a Tx location 3100 and a receiver 700 at an Rx location 3700. The disturbances may affect a transmitting communication beam 300, a transmitting alignment beam 1300, a receiving communication beam 500, a receiving alignment beam 1500, or any combination thereof. The degree of disturbance may depend on factors such as a reflection of solar energy, an absorption of solar energy, a re-radiation of solar energy, a heat source, a cooling source, a water or water vapor source, a surface area, a color, a height above the ground, a distance to the communication channel 400, a shape, a tilt, a rotation, an orientation, a material, a coating, a thickness, or a combination thereof.

Figure 8A:
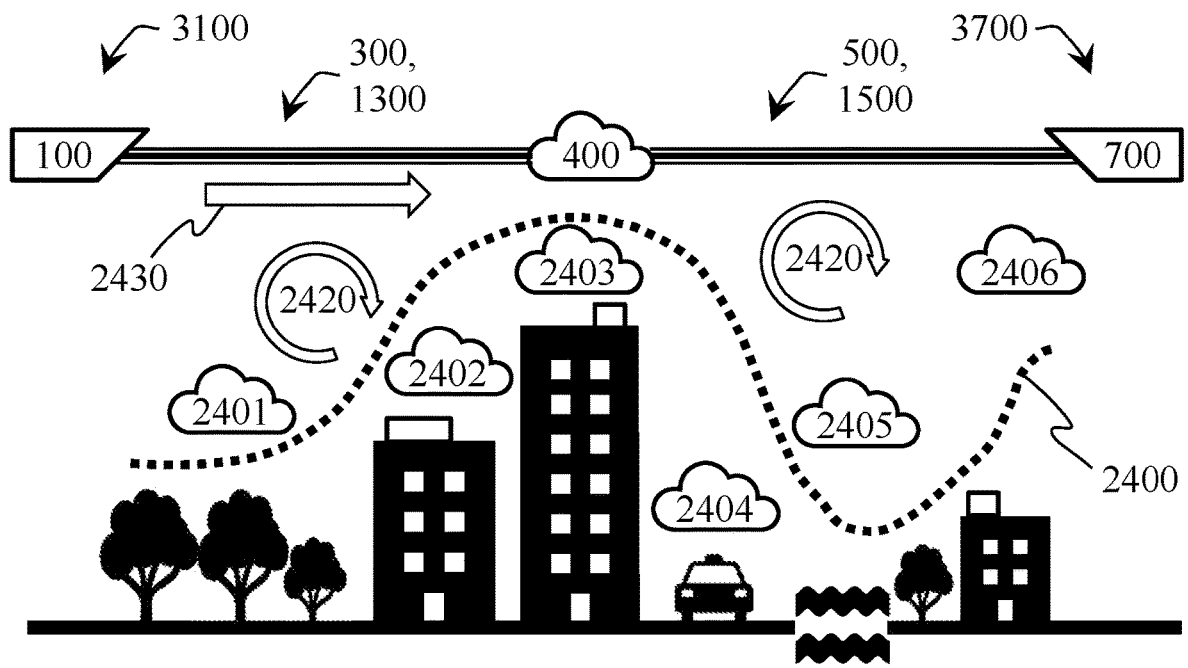
FIG. 8A depicts examples of urban sources of environmental disturbances in a communication channel.

For example, FIG. 8A depicts some disturbances that are more likely to be considered major in an urban environment:
  One or more regions of relatively cooler air due to:
    a plurality of trees 2401, such as a forest or a wood;
    a body of water 2405, such as stream, river, pond. or lake; or
    any combination thereof.
  One or more regions of relatively warmer air due to:
    a rooftop of a building 2402, 2403, 2406;
    reflective panels, such as solar panels, on a building roof 2402;
    a heat source, such as air conditioning, on a building roof 2403, 2406;
    a roadway 2404; or
    any combination thereof.

Figure 8B:
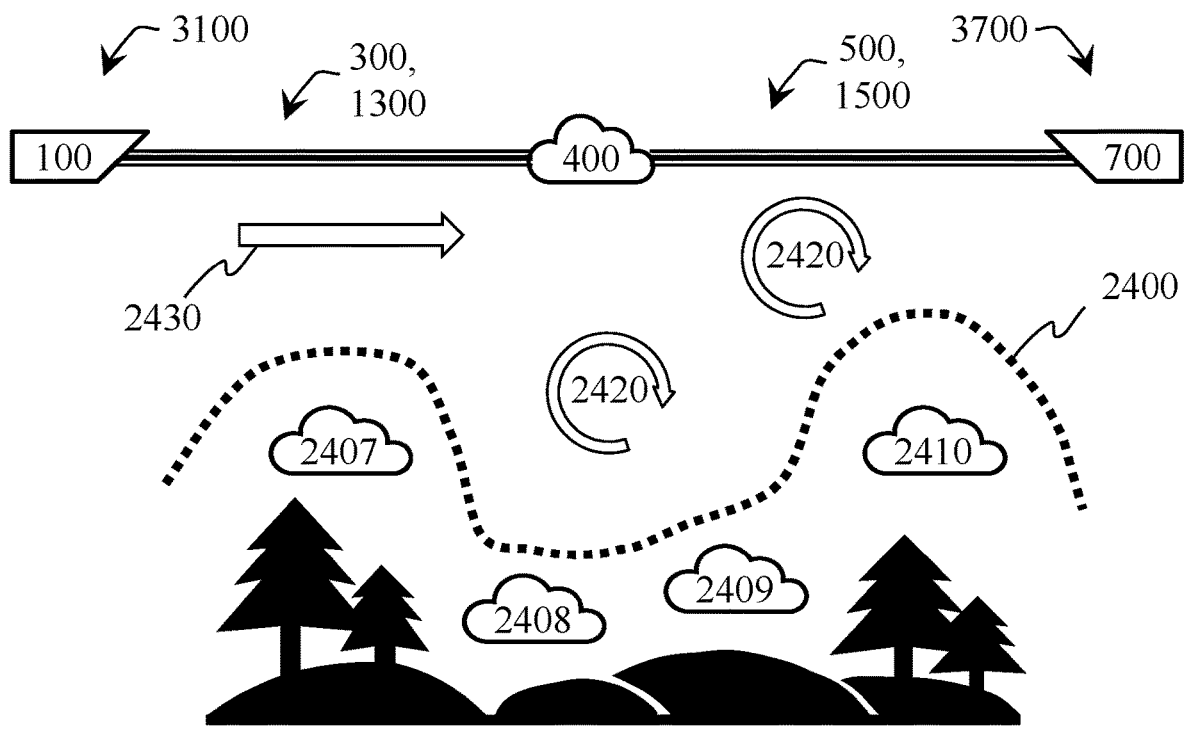
FIG. 8B depicts examples of suburban or open sources of environmental disturbances in a communication channel.

For example, FIG. 8B depicts some typical disturbances that are more likely to be considered major in a suburban or open environment:
  one or more regions of cooler air due to open, flat green areas 2408, 2409, such as fields or meadows;
  one or more regions of warmer air due to a plurality of high trees 2407, 2410, such as a forest or a wood;
  or any combination thereof.

Additionally or alternatively, wind may blow in a prevailing direction 2430 in both urban and suburban environments. Additionally or alternatively, regions of local turbulence 2420 may form, influencing the communication channel 400 path above the suburban and urban environments. The presence of tall buildings also generate additional wind currents, which may affect a prevailing wind direction 2430 and/or create one or more additional regions of local turbulence 2420.

During operation of an FSO link, the day-to-day basic conditions are expected to remain relatively constant. Major unexpected influences on the estimated scintillation are more likely to be related to changes which may have a major influence on the temperature contour 2400, such as the appearance of a new road 2404 or the installation of solar panels on a building rooftop 2402

The invention is at least partially based on the insight that scintillation may be caused by local heating and cooling which may remain relatively constant except for a strong dependence on temperature. By determining one or more temperature distributions along the communication channel 400, a degree of scintillation may be estimated using a small amount of data and processing power.

It may be further advantageous to determine an expected and/or measured temperature contour or profile 2400 along the communication channel 400. This may be considered to be a contour 2400 passing through points, between the ground and the communication channel 400, that are at approximately the same temperature.

It may be advantageous to inspect the path of the communication channel 400 after installation to determine the largest influences on the channel 400. It may also be advantageous to regularly inspect the communication channel 400 for major changes, and to adapt the operational parameters accordingly. Inspection may be performed using satellite data and/or real-time observation. Additionally or alternatively, simulation data may be used. Additionally or alternatively, an Unmanned Aerial Vehicle (UAV) or drone may be used, comprising suitable cameras and/or sensors.

An installation structure, such as an antenna tower (or even a building) may be blown and disturbed by winds from a prevailing direction 2430 for the majority of the operating time. These values may be extracted from online weather services, which may reduce the need to rely on real-time measurements of a large number of environmental values and parameters. This may greatly simplify the estimations to be measured to predict the stochastic disturbances to a high degree.

Longer term variations, such as seasonal variations, may also be taken into account, but these are highly predictable due to the relatively stationary nature of the installation bases, such as antenna towers.

An example of suitable system design parameters and an analytical description of turbulence strength ($C^2n$) based on four main environmental parameters (wind speed, temperature, relative humidity and pressure) is described in "Real-time measurement of meteorological parameters for estimating low-altitude atmospheric turbulence strength", Raj, Selvi, Raghavan, IET Sci. Meas. Technol., 2014, Vol. 8, Iss. 6, pp. 459-469, doi: 10.1049/iet-smt.2013.0236.

Additionally or alternatively, measurements may also be made using instruments such as a scintillometer, an anemometer and/or a sonic anemometer.

If a degree of turbulence is high, the beam width may be increased by modifying the beam divergence at the transmitter 100 to at least partially compensate. Additionally or alternatively, the field-of-view at the receiver 700 may be increased to at least partially compensate.

Additionally or alternatively, this information on a degree of turbulence may be used to dynamically modify one or more parameters controlling the alignment, which may operate with open-loop and or closed-loop control. This may be advantageous as it may allow pointing errors to be distinguished from turbulence errors.

Additionally or alternatively, this information on a degree of turbulence may be communicated to the receiver 700 to indicate a possible cause and degree of a pointing error.

Additionally or alternatively, information about a degree of visibility may be used to estimate an expected degree of attenuation in the communication channel 400. If a low degree of visibility in the atmosphere is measured and/or detected, this information may be communicated to the receiver 700 to indicate a possible cause and degree of a pointing error. This may be advantageous as the receiver 700 may correct more accurately based on the knowledge of the cause, instead of trying to correct for the pointing error by executing a standard alignment algorithm which may fail to re-acquire if the degree of atmospheric attenuation is high. Alternatively, for example, instead of executing a standard algorithm, the divergence of the beam at the transmitter 100 may be decreased to maximize received power, while pointing 320 the transmitting beams 300, 1300 towards the last known position/direction of the receiver 700.

For example, as depicted in FIG. 7A, a Tx positional and/or movement estimator 910 (Tx positional/movement estimator) may be optionally provided, configured and arranged to estimate positional/movement inaccuracies and a degree of influence on the communication channel 400, based on positional/movement parameters relevant for the Tx positional/movement estimator 910. This Tx positional/movement data 900 may include:

a value of: Tx location 3100, Tx altitude, Tx direction, Tx pitch, Tx roll, Tx yaw, or any combination thereof provided as Tx positional data 930. These include parameters that are determined to a high degree by the physical installation of the transmitter 100 and the transmitter enclosure (not depicted, but described below), and are expected to be known and/or measurable during installation and/or maintenance;

a value of: Tx disposition, Tx speed, Tx acceleration, Tx rotation, Tx heave, Tx sway, Tx surge, or any combination thereof provided as Tx movement data 935. These include parameters that are determined to a high degree by mechanical and physical properties of the transmitter enclosure (not depicted but described below), the properties of the support to which the transmitter enclosure (not depicted) is attached, the method of attachment, and environmental influences. These are expected to be low frequency (<1 kHz) misalignments caused by, for example, twist (or torsion) and/or sway (or deflection) within an antenna tower upon which the FSO transceiver is fixed;

a value of: Rx location 3700, Rx altitude, Rx direction, or any combination thereof provided. These include parameters that are determined to a high degree by the physical installation of the receiver 700 and the receiver enclosure (not depicted), and are expected to be known during installation and/or maintenance. These values are expected to be relatively constant and to be comprised in the Rx positional data described below;

a value forecasted or predicted, provided as Tx forecast movement data 937. Additionally or alternatively, the transmitter 100 may be configured and arranged to forecast or predict one or more values to be provided as Tx forecast movement data 937;

historical values, provided as historical Tx positional and/or movement data 950. Additionally or alternatively, historical Tx positional and/or movement data 950 may be stored in the transmitter 100. Additionally or alternatively, the transmitter 100 may be configured and arranged to generate one or more values to be provided as historical Tx positional and/or movement data 950;

one or more inputs to the Tx direction controller 800 provided for the turbulence estimator 810 described above;

or any combination thereof.

Additionally or alternatively, Rx feedback data 1870 may be provided to the Tx directional controller 800 by means of an Rx to Tx data channel. With a sufficiently high data rate, errors detected in the receiver 700 may be corrected or compensated in the transmitter 100.

In use, the Tx directional controller 800 provides Tx directional data 850 to be communicated as data via the alignment beam 1300, 1500 to the receiver 700. This Tx directional data 850 corresponds to one or more nominal (or intended) Tx pointing directions 320 of the transmitter 100, and may be used by a receiver to determine a degree of misalignment. As described below, this degree of misalignment may be at least partially corrected and/or compensated by modifying one or more receiver configuration parameters. Optionally, the Tx directional controller 800 may determine and set one or more optical configuration parameters 820 to point the transmitting beams 300, 1300 in a predetermined and/or controlled direction 320 using the one or more variable optical elements. Optionally, the Tx directional data 850 may be used during an initial and/or coarse alignment, as described below.

For example, at least part of the Tx directional data 850 may correspond to one or more properties of the transmitting beams 300, 1300 selected from the group comprising: a Tx pointing direction 320, a beam angle, a beam width, a degree of collimation, a degree of divergence, a field-of-view, an intensity distribution in a radial cross-section, a total beam power, a laser wavelength, a laser line width, an optical amplifier power (which may change a noise level), a beam quality (which may be dependent on one or more optical configuration parameters 820), similar information about any additional beams, or any combination thereof.

For example, at least part of the Tx directional data 850 may correspond to one or more co-ordinates, associated with a location of the transmitter 100 and/or one or more receivers 700, selected from the group comprising: a geographic co-ordinate, a longitude, a latitude, a radionavigation co-ordinate, a satellite-based co-ordinate, a GPS co-ordinate, a GLONASS co-ordinate, a Galileo co-ordinate, a BeiDou co-ordinate, a NAVIC, a QZSS co-ordinate, a WiFi network ID, a mobile phone cell tower ID, a radio beacon, a Bluetooth beacon, or any combination thereof.

For example, at least part of the Tx directional data 850 may correspond to one or more parameters selected from the group comprising:
- a Tx optical configuration parameter 820 for the transmitter 100, a configuration parameter for a variable optical element comprised in the transmitter 100, Tx atmospheric data 860, Tx positional data 930, Tx movement data 935 from a Tx movement sensor 945, atmospheric data 860 associated with a location and/or altitude through which the communication channel 400 passes, Rx location 3700, Rx altitude, Rx direction, or any combination thereof.

If a Rx to Tx data channel is provided, it may be advantageous if at least a part of the Tx directional data 850 corresponds to one or more parameters selected from the group comprising: a Rx optical configuration parameter for a receiver (not depicted), a configuration parameter for an Rx variable optical element (not depicted) comprised in a receiver 700, Rx atmospheric data, Rx positional data, Rx movement data 1900, or any combination thereof.

Figure 2B:
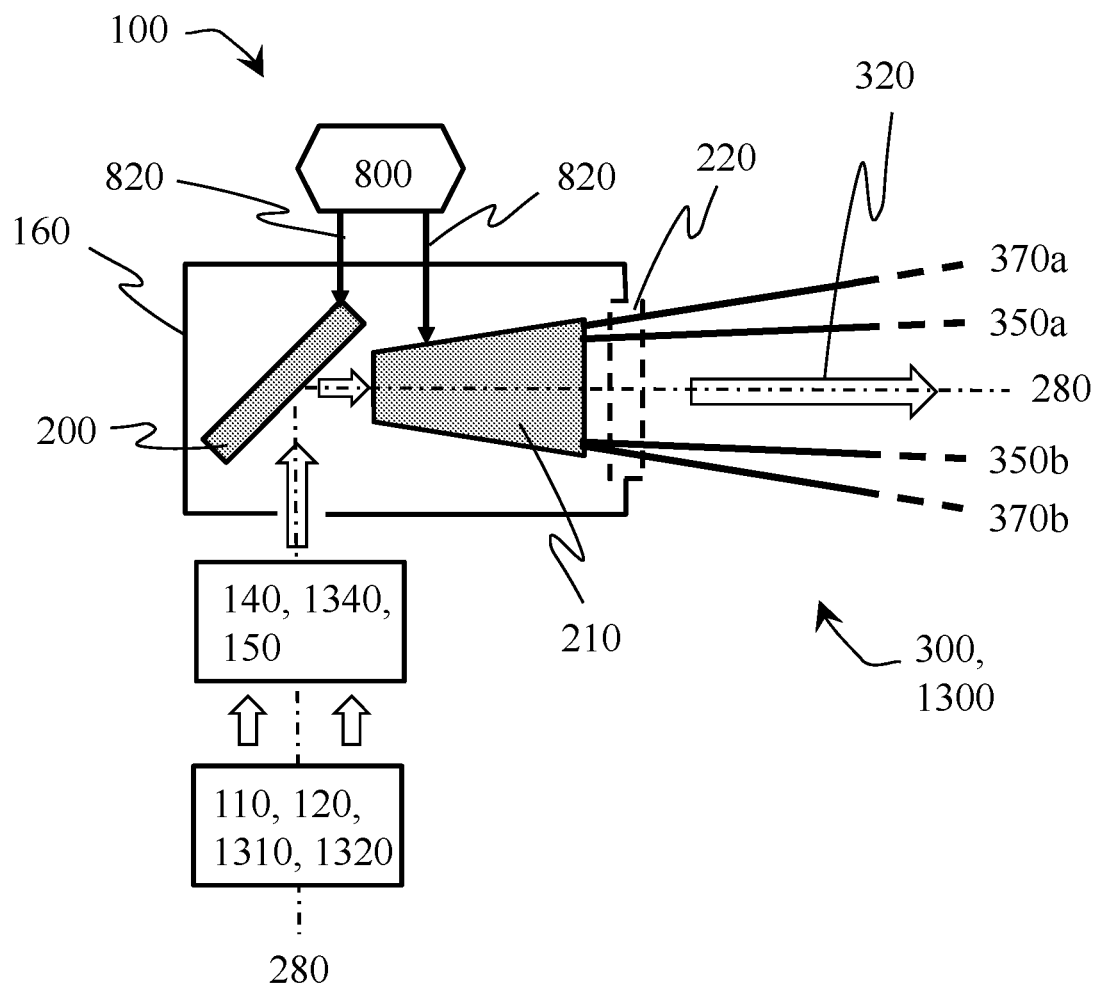
FIG. 2B schematically depicts an example of a transmitter optical aligner.

FIG. 2B schematically depicts an example of a Tx optical aligner 160, configured and arranged to vary one or more directional properties of the transmitting beams 300, 1300. In this example, the Tx optical aligner 160 comprises one or more variable optical elements 200, 210, such as movable, adaptive and/or deformable elements, configured and arranged to vary one or more directional properties of the transmitting beams 300, 1300.

The one or more directional properties of the transmitting beams 300, 1300 may be selected from the group comprising: a beam angle, a beam width, a degree of collimation, a degree of divergence, a beam direction, a field-of-view, an intensity distribution in a radial cross-section, or any combination thereof.

In this example, the Tx optical aligner 160 comprises:
an optional moveable mirror 200, configured and arranged to receive light from the radiation sources 110, 1310 which have passed though the beam conditioners 140, 1340 (if provided) and through the beam generator/combiner 150. It is further configured and arranged to reflect at least a portion of the light received towards a variable divergence optical module 210.

The movable mirror 200 may be implemented using a motorized mirror. Functionally, this may be considered a reflective surface which is electronically actuated. Different actuation methods are available, as well as different reflective surface sizes and qualities. These methods include: piezo, voice coil, reluctance, stepper, MEMS, and more. Typical specifications for a motorized mirror may be a few degrees of range.

In this example, the Tx optical aligner 160 further comprises:
a variable divergence optical module 210, configured and arranged to receive the light from the optional moveable mirror 200, and to expand the transmitting beams 300, 1300 and/or to vary the divergence 350ab, 370ab of the transmitting beams 300, 1300.

For example, it may use defocus between two optical elements in a basic two-element expander.

For example, it may be a multi-element beam expander with variable magnification ratio—by changing beam waist size, the divergence of the beam may also be changed.

The main goal of this module is to adapt a beam width of the receiving beams 500, 1500 received at the receiver 700. Any suitable configuration may be used, including, for example:
- modifying a magnification of a beam expander. By changing a beam size, a divergence may also change according to the formula: $\theta=\lambda/(\pi n w_0)$, where $\theta$ is the half angle divergence, n is the refractive index and wo is the beam waist radius. If the beam waist is located at the transmitter 100, having a smaller divergence results in a smaller beam 550ab at the receiver 700, and a higher divergence results in a bigger beam 570ab at the receiver 700. The magnification of the beam expander, typically comprising at least two optical elements, may be modified by including one or more additional moving lens or lenses between the original optical elements. By (electronically) moving these lens(es) the magnification may be modified. Many different configurations may be used, such as those available at: www.jenoptik.com/products/optical-systems/objective-lenses-for-high-precision-laser-material-processing/beam-expander. Alternatively, the examples found at www.thorlabs.com/navigation.cfm?guide_id=2023 may also be used.
- moving the location of a beam waist may also be used to modify a beam size at the receiver 700. Any suitable technique may be used, such as using optics to modify Gaussian beam parameters (divergence, beam waist position) to achieve a predetermined and/or controlled received beam width. For example, change a beam size (and therefore also divergence) and/or change a beam waist position. A practical method for creating a beam waist of a specified diameter at a specified location for Gaussian beams is described in "Focusing of spherical Gaussian beams", Self, APPLIED OPTICS/Vol. 22, No. 5, 1 Mar. 1983, doi: 10.1364/AO.22.000658.

For example, a negative beam waist position may also be advantageous to provide a larger beam width at the output of the Tx aperture 220 to conform to eye-safety limits, while still having a pre-determined and/or controlled divergence.

In this example, the Tx optical aligner 160 further comprises:
a Tx aperture and/or radiation window 220. This is depicted because the Tx optical aligner 160 is the last module of the transmitter 100 where the transmitting beams 300, 1300 exits the transmitter 100.

In this example, the Tx directional controller 800 is configured and arranged to determine and/or receive at least one Tx pointing direction 320, and to determine one or more optical configuration parameters 820, and to provide the one or more configuration parameters 820 to the moveable mirror 200 and/or the variable divergence optical module 210.

These variable optical elements 200, 210 may be provided with electrical motors and actuators to provide sufficient movement. For a Tx moveable mirror 200, a typical FSO system may require a few degrees of range. For a Tx variable divergence module 210, a change in divergence in the order of tens of μ rad may be sufficient.

Providing an active alignment system may be advantageous to compensate for possible disturbances, such as:
- twisting and/or swaying of structures, such as antenna towers and buildings, to which the transmitter 100 and/or receiver 700 are attached. Such twist and/or sway movements may be highly periodic. They may also be highly predictable based on measurement and/or simulation, allowing a high degree of compensation; and/or
- thermal expansion of structures, such as antenna towers and buildings.

The degree of correction may be predetermined and/or controlled, depending on the most likely disturbances and the particular setup. For example,
- decreasing beam divergence may reduce geometrical propagation losses
- increasing beam divergence may reduce geometrical pointing losses
- increasing beam divergence may increase the field-of-view (FOV)
- increasing field-of-view and/or divergence may decrease the effect of scintillations Geometrical propagation losses: the simplified geometrical propagation gain $G_{geo}$ based on some system parameters may be defined as a multiplication of the transmitter antenna gain $G_{TX}$, free space path loss $L_{fs}$ and receiver antenna gain $G_{RX}$. Defined as $G_{geo} = G_{TX} L_{fs} G_{RX}$, with:

$$G_{TX} = \frac{8}{\theta^2}$$

$$L_{fs} = \left(\frac{\lambda}{4\pi z}\right)^2$$

$$G_{RX} = 4\left(\frac{\pi \rho_{RX}}{\lambda}\right)^2$$

This can be simplified:

$$G_{geo} = 2\left(\frac{\rho_{RX}}{\theta_{HA} L}\right)^2$$

with receiver aperture radius $\rho_{RX}$, half angle beam divergence $\theta_{HA}$ and distance from transmitter to receiver L. This derivation assumes that the beam waist is located at the transmitter 100 and a Gaussian shaped beam is used. $G_{geo}$ is expected to be smaller than 1, which means that power is lost because the equation is expressed in linear terms. So, if divergence is decreased, $G_{geo}$ will increase, which is equal to reducing propagation loss Geometrical pointing losses: for Gaussian beams where the pointing error $\theta_p$ is smaller than the half angle beam divergence $\theta_0$, the following equation can be used to estimate geometrical pointing losses:

$$G_{point} = e^{-\frac{2\theta_p^2}{\theta_0^2}}$$

This equation is an approximation that is only valid in a certain region and assumes that the beam waist is located at the transmitter aperture 220. Similar to the previous equation, $G_{point}$ will be less than 1, resulting in a loss.

The improved optical communication transmitter 100 may be used with limited functionality together with any suitable conventional receiver. However, such a conventional receiver is not configured and arranged to demodulate and make use of the Tx directional data 850.

Figure 1B:
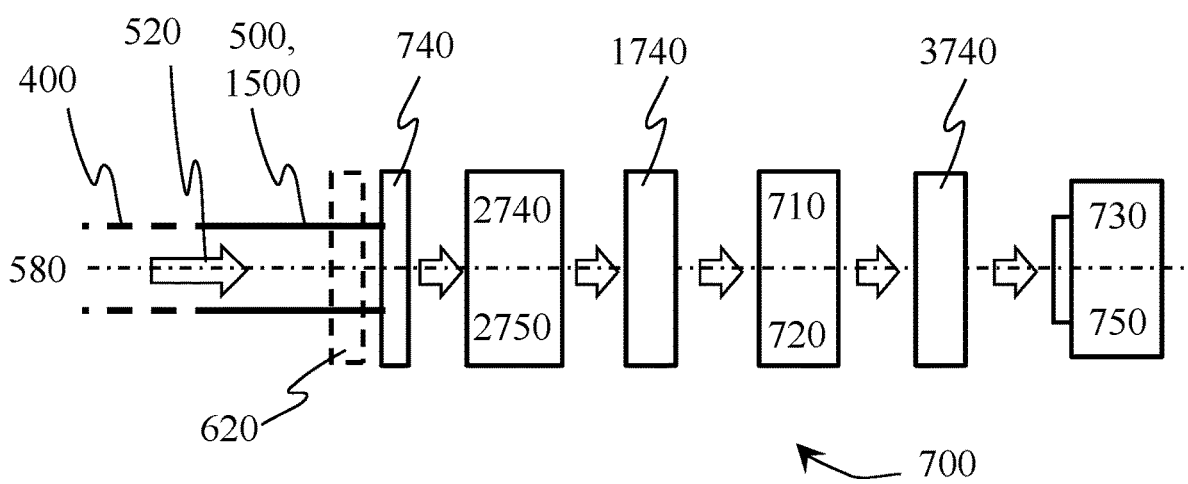
FIG. 1B schematically depicts a communication receiver, suitable for use with the optical communication transmitters disclosed herein.
Figure 5B:
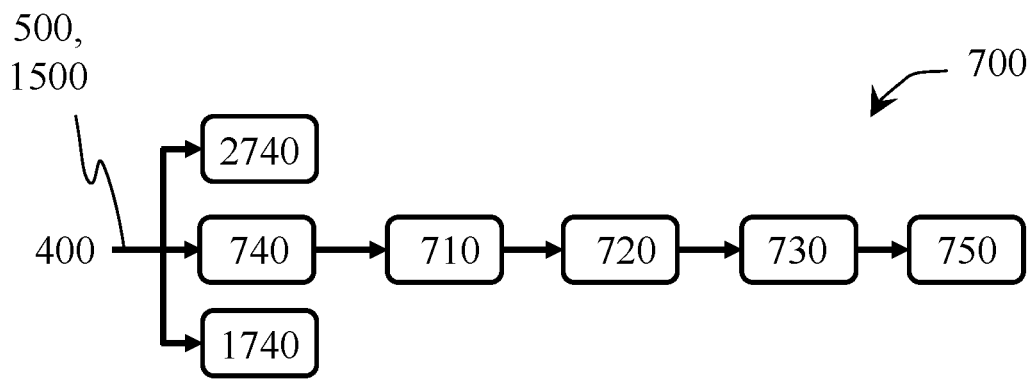
FIG. 5B depicts functionalities which may be comprised in communication receiver.

FIG. 1B schematically depicts an improved optical communication receiver 700, suitable for use with the optical communication transmitter 100 disclosed herein. FIG. 5B depicts the functionalities which may be comprised in such a communication receiver 700. The figures are schematic:— unless specified otherwise, one or more modules/elements/components/functionalities:
- may be provided at any suitable position along a receiver optical axis 580; and/or
- may be combined; and/or
- may be distributed over a plurality of instances; and/or
- may be disposed off-axis.

The communication receiver 700 is configured and arranged to receive at least a portion of a receiving optical communications beam 500 and/or a receiving alignment beam 1500. If the degree of alignment is sufficient, at least a portion of the receiving beams 500, 1500 are received along the receiver optical axis 580.

The receiver 700 is preferably configured and arranged to receive receiving beams 500, 1500 over a wide range of angles, and to direct a significant portion of such beams 500, 1500 along the receiver optical axis 580. It is also assumed that any misalignment due to twist and/or sway is low enough that a significant portion of the receiving beams 500, 1500 is received.

The communication receiver 700 is further configured and arranged to demodulate and use Tx directional data 850 transmitted over the communication channel 400 in the receiving alignment beam 1500.

For relatively short and/or undisturbed channels 400, a large portion of the energy of the transmitting beams 300, 1300 may be comprised in the receiving beams 500, 1500. However, for FSO channels 400, where distances of between 2 and 10 km are expected, and up to 40 km are desired, the portion in the receiving beams 300, 1300 may be relatively small.

The communication channel (or link) 400 may also be dependent on sufficiently correct operation of both the transmitter 100 and receiver 700—even small inaccuracies may lead to an unacceptable degree of misalignment and lower amounts of transmitted energy being received. In some extreme cases, such as very dense fog or a physical obstruction (or extreme mechanical misalignment beyond the correction range of the one or more receiver steering mirrors), no portion of the receiving beams 500, 1500 may be detectable.

Factors that may influence the reduction or loss of the receiving beams 500, 1500 may include: the nature and length of the communication channel 400, any range-limiting factors such as fog, beam dispersion, pollution, atmospheric dispersion, positional stability of the transmitter 100 and receiver 700 (particularly in wind), and interference.

As described above, the transmitter 100 may operate in at least three basic transmitting modes:
1) transmission of at least one alignment beam 1300 and at least one communications beam 300;
2) transmission of at least one communications beam 300; or
3) transmission of at least one alignment beam 1300.

Similarly, the receiver 700 may also operate in at least three complementary basic modes:
1) receiving of at least one alignment beam 1500 and at least one communications beam 500. In other words, the receiver 700 expects to receive at least two beams 500, 1500. Advantageously, this is used during communications operations to attain and/or maintain a sufficient degree of alignment. Additionally or alternatively, at least one receiving alignment beam 1500 and/or at least one receiving communications beam 500 may be used to detect, characterize and/or monitor one or more environmental parameter;
2) receiving of at least one communications beam 500. If the degree of alignment of the receiving communications beam 500 is sufficient, the at least one receiving alignment beam 1500 may be turned off at the transmitter 100 or a misaligned receiving alignment beam 1500 may be ignored or insufficiently corrected, In other words, the receiver 700 expects to receive at least one communications beam 500, Optionally, this may be during communications operation for short periods where the expectation is that a sufficient degree of alignment is expected (or predicted) to be maintained. Additionally or alternatively, this mode may be used during an initial and/or an operational alignment procedure; or
3) receiving of at least one alignment beam 1500. If the degree of alignment of the receiving alignment beam 1500 is sufficient, then at least one receiving communications beam 500 may be turned off at the transmitter 100 or a misaligned receiving communications beam 500 may be ignored or insufficiently corrected, In other words, the receiver 700 expects to receive at least one alignment beam 1500, This mode may be used during an initial and/or an operational alignment procedure. Additionally or alternatively, at least one receiving alignment beam 1500 and/or at least one receiving communications beam 500 may be used to detect, characterize and/or monitor one or more environmental parameter.

As depicted in FIG. 1B, the communication receiver 700 comprises:
(a) one or more main electromagnetic radiation detectors 730 (or radiation detectors), suitable for measuring one or more energy parameters of at least a portion of the receiving optical beams 500, 1500. For example: one or more photodetectors, photodiodes or photosensors may be used individually, in groups and/or in an array. For example, one or more avalanche photodiodes (APD's) may be used.

In some configurations, the portion of the receiving beams 500, 1500 detected at the one or more main detectors 730 may be modified compared to the receiving beams 500, 1500 received due to one or more intervening components, such as an optional Rx beam conditioner 720. In other configurations, receiving beams 500, 1500 may be passed substantially unmodified to the one or more main detectors 730.

Any suitable main detector 730 may be used—the choice may depend, for example, a required sensitivity, a wavelength, an energy of the transmitting beams 300, 1300 and one or more properties of the channel 400 it passes through. In configurations where the receiving beams 500, 1500 has a relatively high energy, many different types of photodetectors may be used.

(b) optionally, an Rx beam conditioner 720, comprising one or more optical elements. The configuration and arrangement of the Rx beam conditioner 720 is determined by the properties and dimensions of receiving beams 500, 1500, and the configuration and arrangement of the radiation detector 730.

It may focus receiving beams 500, 1500 onto the photo sensitive surface and/or aperture of the detector 730. Additionally or alternatively, the Rx beam conditioner 720 may modify the beam width, making it smaller or larger. Additionally or alternatively, the Rx beam conditioner 720 may convert the beam from free space to fiber transmission.

In some configurations, one or more the main radiation detectors 730 may be configured and arranged to directly detect a sufficient portion of receiving beams 500, 1500, and a separate Rx beam conditioner 720 may be not required.

(c) a communications demodulator 750, connected electrically to the one or more main radiation detectors 730, configured to retrieve the data (or information) encoded in the communication beam by the communications modulator described above, including communication data (not depicted in FIG. 1B).

Changes in the properties of the receiving beams 500, 1500 due to the channel 400, and due to the configuration of the optical, mechanical and electrical components used in the receiver 700, may be simulated, estimated and/or measured to configure and arrange the receiver 700 to optimize the retrieval of the data (or information). It may also be advantageous to provide amplification, such as an electrical amplifier to further optimize data retrieval—for example, a transimpedance amplifier (or TIA) may be used.

Optionally, one or more components may be used to further boost and/or filter the electrical signal.

Optionally, one or more components may be used to recover one or more parameters of the carrier wave and/or clock.

Optionally, the one or more main radiation detectors 730 and the communications demodulator 750, may be further configured and arranged to retrieve the data (or information) encoded in the alignment beam by the alignment modulator described above, including Tx directional data (not depicted in FIG. 1B).

Optionally or additionally, one or more optical amplifiers may be used.

Optionally, if the Rx beam conditioner 720 is configured and arranged to divert the receiving beams into a fiber, an amplifier may be positioned between the Rx beam conditioner 720 and the one or more main detectors 730. For example, an Optical Low noise (pre-)amplifier (LNA) may be used.

In many cases, such as when using on-off-keying, n-PAM or direct-detection, a radiant detector may be comprised in the one or more main detectors 730 as it is mainly intensity/irradiance which is to be detected.

However, for coherent communication protocols, such as QPSK or n-QAM, phase information is preferably also retrieved. For example:
- phase information may be retrieved by mixing the received signal with the signal from a local optical source that has the same wavelength as the radiation source in the transmitter. This effectively demodulates the received signal, resulting in an intermediate frequency (IF) signal.
- preferably, two optical paths are provided—one for each polarization
- additionally a 90° hybrid may be used to combine the received signal with the local signal, after which two pairs of balanced photodiodes are preferably used
- after opto-electrical conversion by trans-impedance amplifiers (TIA), digital processing may be required to retrieve the communication data.

For example, a homodyne receiver employing phase and polarization diversities, may be suitable, such as the detector depicted in FIG. 9 of "Fundamentals of Coherent Optical Fiber Communications", Kikuchi, Journal of Lightwave Technology, Vol. 34, NO. 1, Jan. 1, 2016, doi: 10.1109/JLT.2015.2463719.

A communication system may comprise:
- an optical transmitter 100 as described herein, configured and arranged to produce a first optical communications beam 300 and a first optical alignment beam 1300; and
- one or more communication receivers 700 as described herein, configured and arranged to receive at least a portion 500, 1500 of the first optical communications beam 300 and/or of the first optical alignment beam 1300 produced by the optical transmitter 100.

Such a communication system may be configured and arranged to provide one-way communication between the transmitter 100 and one or more receivers 700 through a communication channel 400. In other words, they are configured and arranged to operate in a simplex mode—a transmitter 100 broadcasts and one or more receivers 700 listens.

More complex communication systems are described below.

For a communication system with a transmitter 100 and at least one receiver 700, some degree of initial alignment may be required. In configurations where the transmitting beams 300, 1300 have a relatively large beam width and/or for relatively short communication distances, a lower degree of alignment may be required. In such configurations, an optical telescope, such as a rifle sight, may be used and/or the electrical signal level detected at the one or more detectors 730, 740, 1740, 2740, 3740 may be monitored while the orientation of the communication receiver 700 may be detected. In some configurations, a sighting tube may be sufficient.

For an accurate and reliable FSO system, operating over longer distances, a higher degree of alignment is preferred. For example, if the Tx optical axis 280 of the transmitter 100 coincides to a high degree with the optical axis 580 of the receiver 700 and/or the transmitting beams 300, 1300 are received sufficiently after being transmitted with a low degree of divergence.

The communication receiver 700 further comprises:
(d) an Rx optical aligner 710, for example a telescope, configured and arranged to intercept at least a portion of the receiving beams 500, 1500, and to direct the portion of the receiving beams 500, 1500 towards the one or more main radiation detectors 730 along the receiver optical axis 580. It may comprise one or more optical elements.

The configuration and arrangement of the receiver optical aligner 710 may be determined by the properties and/or dimensions of the portion of the receiving beams 500, 1500 received after transmission through the channel 400, and the desired directional properties of the beam to be directed towards the one or more main radiation detectors 730.

It may be used to perform an initial alignment and/or a degree of continuous alignment. It may also be used to perform fine tuning of one or more directional beam properties after transmission, such as beam angle, beam width, collimation and/or beam direction. For example:
- by modifying one or more angles of the portion of the receiving beams 500, 1500; and/or
- by modifying a degree of collimation in the transmitting beams 300, 1300, receiving beams 500, 1500 of limited width may be produced that will be accurately and reproducibly detected by the one or more radiation detectors 730, 740, 1740, 2740, 3740; and/or
- by focusing the beam onto the one or more main radiation detectors 730 to increase the beam intensity and improve the data recovery.

In particular, for an FSO system over larger distances, alignment may be required to optimize the reliability and accuracy of communication.

The optional Rx beam conditioner 720 may provide additional ways of varying one or more directional properties of the beam received from the receiver optical aligner 710, and therefore provides a more direct way of varying one or more directional properties of the portion of the receiving beams 500, 1500.

As depicted in FIG. 1B, the receiver 700 may further comprise one or more radiation detectors 740, 1740, 2740, 3740, configured and arranged as one or more alignment detectors—in other words, configured and arranged to measure one or more characteristics or parameters of the receiving communications beam 300 and/or the receiving alignment beam 1300 which may be used to determine a degree of alignment or misalignment of the receiving communications beam 300 and/or the receiving alignment beam 1300.

As depicted, the receiver 700 comprises:
- an optional first alignment detector 740, configured and arranged as an aperture detector proximate the receiver aperture window 620. As it comprises one or more radiation detectors (not depicted) on the outside of the enclosure, this first alignment detector may be advantageous when there is a high degree of misalignment, and very little energy from the receiving beams 500, 1500 passes through the aperture 620. Due to its position proximate the aperture window 620, it may advantageously be configured and arranged to detect a beam direction component of the receiving beams direction 520;
- an optional second alignment detector 1740, disposed between a third alignment detector 2740 and the Rx optical aligner 710. Due to its position proximate the aperture window 620, it may advantageously be configured and arranged to detect a beam direction component of the receiving beams direction 520;
- an optional third alignment detector 2740, disposed between the aperture window 620 and the second alignment detector 1740. connected electrically to an alignment demodulator 2750. Due to its connection to the alignment demodulator 2750, the third alignment detector 2740 may be advantageously configured and arranged to optimize the demodulation of the transmitted Tx directional data (not depicted); and an optional fourth alignment detector 3740, disposed between the Rx optical aligner 710 and the one or more main radiation detectors 730. Due to its position optically downstream from the Rx optical aligner 710, it may advantageously be configured and arranged to detect a beam angle component of the receiving beams direction 520.

Two or more of these alignment detectors 740, 1740, 2740, 3740, disposed at different positions along a receiver optical axis 580, may be configured and arranged such that comparison of the radiation measurements at each of these two or more detectors (740, 1740, 2740, 3740) indicates a beam direction and/or a beam angle associated with at least one first optical alignment beam (1500).

Additionally or alternatively, the two or more alignment detectors 740, 1740, 2740, 3740 may be configured and arranged such that comparison of the radiation measurements at each of these two or more detectors (740, 1740, 2740, 3740) indicates a beam direction and/or a beam angle associated with at least one first optical communications beam (1500).

Figure 3A:
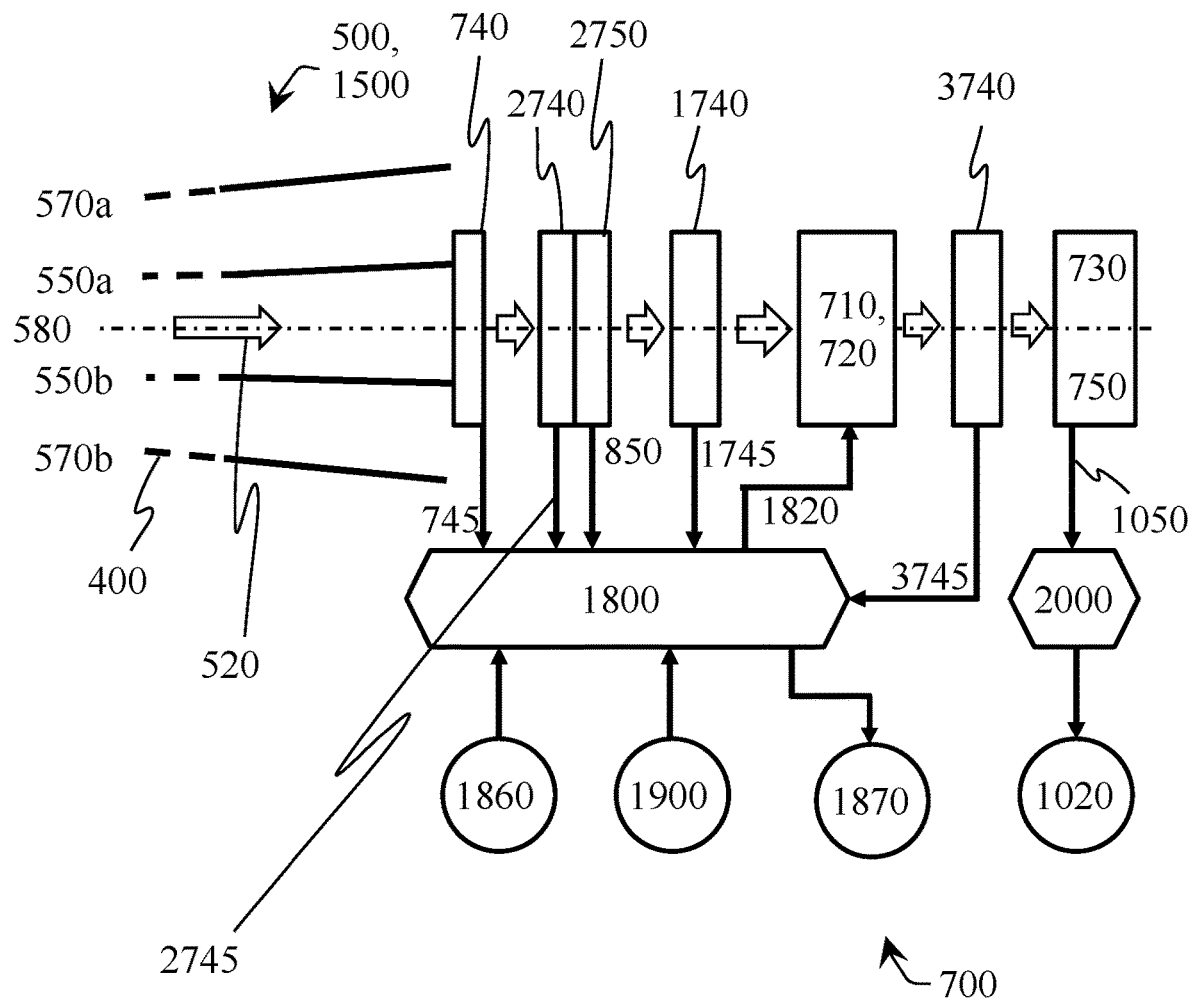
FIG. 3A schematically depicts measuring of misalignment of the receiving beams.

FIG. 3A schematically depicts extracting data from the receiving optical beams 500, 1500, including Tx directional data 850. It depicts details of the optical communication receiver 700 depicted in FIG. 1B. For example, FIG. 3A depicts the receiver optical aligner 710, the optional Rx beam conditioner 720, the one or more main radiation detectors 730, and the one or more alignment detectors 740, 1740, 2740, 3740 disposed along the receiver optical axis 580. It also depicts the alignment demodulator 2750 and the communications demodulator 750.

The one or more radiation detectors 740, 1740, 2740, 3740 are configured and arranged to measure at least one characteristic of the one or more optical communications beam 500 and/or the one or more first optical alignment beam 1500. If required, demodulation functions for communications data and alignment data may be combined or separated by using one or more optical filters.

FIG. 3A further depicts:

a Rx data controller 2000, configured and arranged to receive communication data 1050 from the communications beam demodulator 750, to convert the communication data 1050 to information 1020, and to provide the information 1020 as required by the receiver 700 and/or by an operator of the receiver 700. It is assumed that the demodulation and conversion reconstructs to a high degree the information 1020 that was converted to communication data 1050 for modulation in the transmitter (not depicted). In other words, during use for communication, modulation (or variation) in one or more properties of the optical communications beam 500, such as an intensity of the receiving communication beam 500, is measured (demodulated) 750 and digitally decoded 1050 to extract the information 1020;

optionally, one or more variable optical elements (not depicted in FIG. 3A) are configured and arranged to vary one or more directional parameters of the receiving beams 500, 1500 upon receipt of one or more configuration parameters 1820. For example, configured and arranged to compensate for a receiving beam direction 520 and/or a receiving beam divergence 550*ab*, 570*ab*. In this example, the divergence may be predetermined and/or controlled by the transmitter 100 in a range between a high divergence 570*a*, 570*b* and a low divergence 550*a*, 550*b*. The receiving beams 500, 1500 are considered to have a low divergence 550*a*, 550*b* if the beam width of the receiving beams 500, 1500 is approximately the same over a significant distance. The receiving beams 500, 1500 are considered to have a high divergence 570*a*, 570*b* if the receiving beams 500, 1500 increase in diameter when moving along the receiver optical axis 580 towards the receiver 700. For example, as described above, if the beam waist position is moved at the transmitter, then a 'lower divergence' beam may have a larger beam width at the receiver 700 than a 'higher divergence' beam.

The one or more variable optical elements may be disposed in any suitable module and/or disposed at any suitable position on the optical axis 580. Additionally or alternatively, the one or more variable optical elements may be comprised in the Rx optical aligner 710. Additionally or alternatively, the one or more variable optical elements may be comprised in the optional Rx beam conditioner 720;

FIG. 3A further depicts:

a Rx directional controller 1800, configured and arranged to receive the Tx directional data 850 from, for example, the alignment demodulator 2750, and to reconstruct predictive data from Tx directional data 850 associated with one or more beam characteristic of the optical communications beam 500 and/or optical alignment beam 1500.

The Rx directional controller 1800 is further configured and arranged to receive measurement data 745, 1745, 2745, 3745 from the one or more radiation detectors 740, 1740, 2740, 3740 associated with the at least one beam 500, 1500 characteristic; and to determine one or more differences between the predictive beam data (reconstructed from Tx directional data 850) and the receiver measurement data 745, 1745, 2745, 3745.

The at least one beam 500, 1500 characteristic may be at least one receiving beam directional property 520 of the optical communications beam 500 and/or optical alignment beam 1500. The receiver directional controller 1800 may then be further configured and arranged to determine a degree of beam 500, 1500 misalignment based on the one or more differences between the predictive beam data 850 and the receiver measurement data 745, 1745, 2745, 3745.

Additionally or alternatively, the at least one beam 500, 1500 characteristic may be associated with a perturbation in the optical communications beam 500 and/or of the optical alignment beam 1500 due to one or more environmental parameters in the communication channel 400 between the receiver 700 and the source of the optical communications beam 500 and/or the source of the optical alignment beam 1500.

It is assumed that the demodulation and conversion reconstructs to a high degree the Tx directional data 850 that was encoded in the alignment beam 500 in the transmitter (not depicted). In other words, during use for communication, modulation (or variation) in one or more properties of the optical alignment beam 1500, such as an intensity of the receiving alignment beam 1500, is measured (demodulated) 2750 and digitally decoded to extract the Tx directional data 850.

Optionally, the Rx directional controller 1800 may be further configured and arranged to convert the Tx directional data 850 to one or more optical configuration parameters 1820, and to provide the one or more configuration parameters 1820 to the one or more variable Rx optical elements. As depicted, the one or more variable optical elements are disposed in the optional beam conditioner 720 and/or the Rx optical aligner 710. Preferably at least one variable optical element is comprised in the Rx optical aligner 710.

Optionally, the Rx directional controller 1800 may receive Rx atmospheric data 1860, and may use this data to influence the generation of the one or more Rx optical configuration parameters 1820. Additionally or alternatively, the Rx directional controller 1800 may receive Rx positional and/or movement data 1900, and may use this data to influence the generation of the one or more Rx optical configuration parameters 1820.

Optionally, the Rx directional controller 1800 may be further configured and arranged to generate Rx feedback data 1870. If an Rx to Tx data channel is available, this feedback data 1870 may be used to at least partially compensate for any perturbations and/or misalignments.

In use, the Rx directional controller 1800 extracts Tx directional data 850 communicated as data via the receiving alignment beam 1500 from the transmitter (not depicted). The Tx directional data 850 represents one or more intended or predicted beam output characteristics of the transmitter, and may be used by the receiver 700 to determine a degree of perturbation and/or misalignment. As described below, this degree of perturbation and/or misalignment may be at least partially corrected and/or compensated by modifying one or more Rx optical configuration parameters 1820.

For example, a degree of misalignment of the receiving beams 500, 1500 may be determined by performing one or more of the following steps:
 determining an intended alignment from predictive beam data (comprised in the Tx directional data 850), which may be extracted by the alignment demodulator 2750 from the data modulated on the alignment beam 1500;
 measuring at least one characteristic of the optical communications beam 500 and/or optical alignment beam 1500 using one or more radiation detectors 740, 1740, 2740, 3740; and
 determining a degree of beam 500, 1500 misalignment based on one or more differences between the predictive beam data 850 and the receiver measurement data 745, 1745, 2745, 3745;

Preferably, the at least one beam 500, 1500 characteristic is selected to be at least one receiving beam directional property 520 of the optical communications beam 500 and/or optical alignment beam 1500. For example, at least one receiving beam direction 520, a beam angle, a beam width, a degree of collimation, a degree of divergence, a field-of-view, an intensity distribution in a radial cross-section, a total beam power, a laser wavelength, a laser line width, an optical amplifier power, a beam quality or any combination thereof.

Similarly, a degree of perturbation of the receiving beams 500, 1500 may be determined by performing one or more of the following steps:
 determining an intended beam 500, 1500 characteristic from predictive beam data (comprised in the Tx directional data 850), which may be extracted by the alignment demodulator 2750 from the data modulated on the alignment beam 1500;
 measuring at least one characteristic of the optical communications beam 500 and/or optical alignment beam 1500 using one or more radiation detectors 740, 1740, 2740, 3740; and
 determining a degree of beam 500, 1500 perturbation based on one or more differences between the predictive beam data 850 and the receiver measurement data 745, 1745, 2745, 3745.

Preferably, the beam characteristic is selected to detect a perturbation due to one or more environmental parameters in the communication channel 400 between the receiver 700 and the source of the optical communications beam 500 and/or the source of the first optical alignment beam 1500. For example, an atmospheric turbulence, a wind velocity, a humidity, an air pressure, an air flow, a temperature, a precipitation, a weather parameter, or any combination thereof.

Figure 7B:
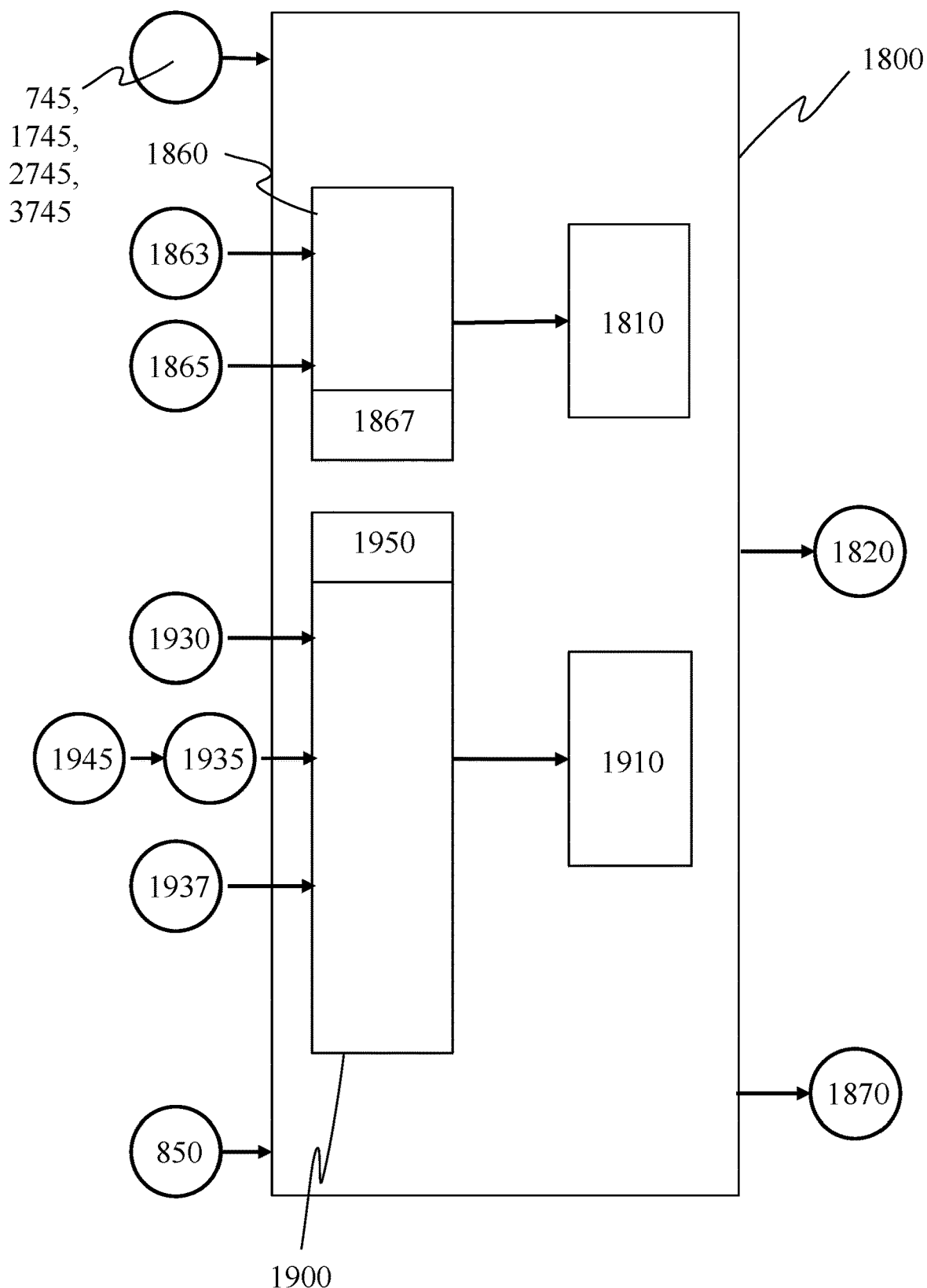
FIG. 7B depicts a schematic overview of inputs and outputs which may be used by a receiver directional controller.

FIG. 7B depicts a schematic overview of one or more inputs which may be used by the Rx directional controller 1800 depicted in FIG. 3A. Inputs are indicated on the left hand-side, and possible outputs on the right-hand side.

The Rx directional controller 1800 may determine and output one or more Rx optical configuration parameters 1820. One or more inputs may be used in the determination—in the example depicted, the inputs are divided into one or more functional groups. The Rx directional controller 1800 may comprise one or more estimator functions.

The Rx directional controller may receive Rx atmospheric data 1860, comprising real-time weather data 1863 and/or forecast weather data 1865;

For example, as depicted, an Rx turbulence estimator 1810 may be optionally provided, configured and arranged to estimate turbulence strength and a degree of influence on the communication channel 400, such as an FSO channel, based on weather parameters relevant for the Rx turbulence estimator 1810. This Rx atmospheric data 1860 may include the same, similar and/or analogous values and parameters as those listed above for the transmitter 100. In particular, the Rx atmospheric data 1860 may include:
 a value of temperature, humidity, air pressure and wind speed;
 a value forecasted or predicted, provided as forecast weather data 1865. Additionally or alternatively, the receiver 700 may be configured and arranged to forecast or predict one or more values to be provided as forecast weather data 1865;
 historical values, provided as historical weather data 1867. Additionally or alternatively, historical weather data 1867 may be stored in the receiver 700. Additionally or alternatively, the receiver 700 may be configured and arranged to generate one or more values to be provided as historical weather data 1867;
 one or more inputs to the Rx direction controller 1800 provided for the Rx positional and/or movement estimator 1910 described below;
 or any combination thereof.

As described above for the transmitter, in the case of an FSO channel 400, the transmitting beams 300, 1300 may be subject to atmospheric turbulence which may result in signal fade and potential packet loss. Atmospheric turbulence may cause three main problems with the receiving beams 500, 1500: beam wander, beam scintillation, and beam spreading. Each atmospheric problem has a specific dynamic footprint—for example, beam wander is characterized by a lower frequency behavior while scintillation shows faster variations.

Beam wander may result in a displacement of the center of the receiving beams 500, 1500 at the receiver 700 and/or an angular deviation.

Beam spreading may result in less power being received at the receiver 700.

Beam scintillation may cause deformation of the wavefront of the receiving beams 500, 1500.

Additionally or alternatively, the effects of beam scintillation may be at least partially compensated and/or decreased by increase a receiver aperture (not depicted) and/or by increasing a field-of-view (FOV) parameter (described below).

By choosing a larger transmitter divergence and/or larger receiver FOV, the effects of beam scintillations may be decreased during high degrees of turbulence. If a degree of atmospheric turbulence is low, the divergence and/or FOV may be decreased to maximize link margin.

It is expected that decreasing divergence will reduce geometrical losses and reducing FOV will reduce stray light entering the receiver, which will improve signal quality. Additionally, it is expected that by increase both, alignment may be simplified.

Mechanical movements that are significant enough to cause a change in Tx positional and/or movement data 900 may overlap in terms of spectral properties with atmospheric effects. Using conventional techniques, distinguishing between these two types of disturbances has not been possible.

By continuously monitoring the behavior of the transmitter 100 and/or receiver 700, the frequency response of the atmospherics along the beam propagation path may be characterized. By monitoring misalignment at a relatively high rate (comparable with a typical alignment control loop bandwidth), the receiver 700 may be able to more easily determine the frequencies of the major disruptions causing misalignment. This provides improved flexibility because the nature of different disruptions may be distinguished—this may allow some types of disruption, such as those caused by atmospheric scintillations, to be ignored and others, such as the low frequency misalignment cause by pole twist/sway, to be corrected to a high degree.

For example, as depicted in FIG. 7B, a Rx positional and/or movement estimator 1910 (Rx positional/movement estimator) may be optionally provided, configured and arranged to estimate positional/movement inaccuracies and a degree of influence on the communication channel 400, based on positional/movement parameters relevant for the Rx positional/movement estimator 1910. This Rx positional/movement data 1900 may include:

a value of: Tx location 3100, Tx altitude, Tx direction, or any combination thereof provided as Tx directional data 850. These include parameters that are determined to a high degree by the physical installation of the transmitter 100 and the transmitter enclosure (not depicted, but described below) and are expected to be known during installation and/or maintenance. These values are expected to be relatively constant and to be comprised in the Tx positional data described above;

a value of: Rx disposition, Rx speed, Rx acceleration, Rx rotation, Rx heave, Rx sway, Rx surge, or any combination thereof provided as Rx movement data 1935. These include parameters that are determined to a high degree by mechanical and physical properties of the receiver enclosure (not depicted but described below), the properties of the support to which the receiver enclosure (not depicted) is attached, the method of attachment, and environmental influences. These are expected to be low frequency (<1 kHz) misalignments caused by, for example, twist and/or sway within an antenna tower upon which the FSO transceiver is fixed;

a value of: Rx location, Rx altitude, Rx direction, Rx pitch, Rx roll, Rx yaw, or any combination thereof provided as Rx positional data 1930. These include parameters that are determined to a high degree by the physical installation of the receiver 700 and the receiver enclosure (not depicted) and are expected to be known and/or measurable during installation and/or maintenance;

a value forecasted or predicted, provided as Rx forecast movement data 1937. Additionally or alternatively, the receiver 100 may be configured and arranged to forecast or predict one or more values to be provided as Rx forecast movement data 1937;

historical values, provided as historical Rx positional and/or movement data 1950. Additionally or alternatively, historical Rx positional and/or movement data 1950 may be stored in the receiver 700. Additionally or alternatively, the receiver 700 may be configured and arranged to generate one or more values to be provided as historical Rx positional and/or movement data 1950;

one or more inputs to the Rx direction controller 1800 provided for the turbulence estimator 1810 described above;

or any combination thereof.

Additionally or alternatively, Rx feedback data 1870 may be generated by the RX directional controller 1800 and provided to the Tx directional controller (not depicted) by means of an Rx to Tx data channel. With a sufficiently high data rate, errors detected in the receiver 700 may be corrected or compensated in the transmitter.

The Rx directional controller is configured and arranged to determine and/or receive at least one Rx receiving direction 520 of the receiving communications beam 500 and/or receiving alignment beam 1500.

Optionally, the Rx directional controller 1800 may determine and set one or more Rx optical configuration parameters 1820 to receive the communications beam 500 and/or alignment beam 1500 from a predetermined and/or controlled direction 520 using the one or more variable optical elements.

Additionally or alternatively, the Rx directional controller 1800 may set one or more receiver optical configuration parameters 1820 and/or one or more configuration parameters for a variable Rx optical element (not depicted) based on data extracted from the Tx directional data 850.

The Rx directional controller 1800 is further configured and arranged to receive alignment data 745, 1745, 2745, 3745 from one or more alignment detector (not depicted).

A degree of alignment may be computed by measuring an energy, such as an RSS (Received Signal Strength), at a plurality of points within at least a portion of the receiving communications beam 500 and/or receiving alignment beam 1500. If these measurements are compared with an expected or predicted light intensity distribution in a radial cross-section of the beam, an estimation may be made of the position of the transverse cross-sectional center of the receiving communications 500 and/or alignment 1500 beam. A degree of misalignment may therefore be determined by comparing the estimated RSS-based center with the receiver optical axis 580.

The expected or predicted light intensity distribution in a radial cross-section of the beam may be determined by measurement and/or simulation. Additionally or alternatively, one more parameters derived from the Tx directional data 850 may also be used.

Measurement at a plurality of points within a beam may be performed by:

using a detector that has a plurality of segments or detector elements, allowing a plurality of intensity measurements to be made approximately simultaneously;

using one or more variable optical elements to vary one or more directional properties of the beam (scanning), allowing a plurality of intensity measurements to be made sequentially;

using one or more movable radiation detectors to vary a radial position, allowing a plurality of intensity measurements to be made sequentially;

or any combination thereof.

Figure 3B:
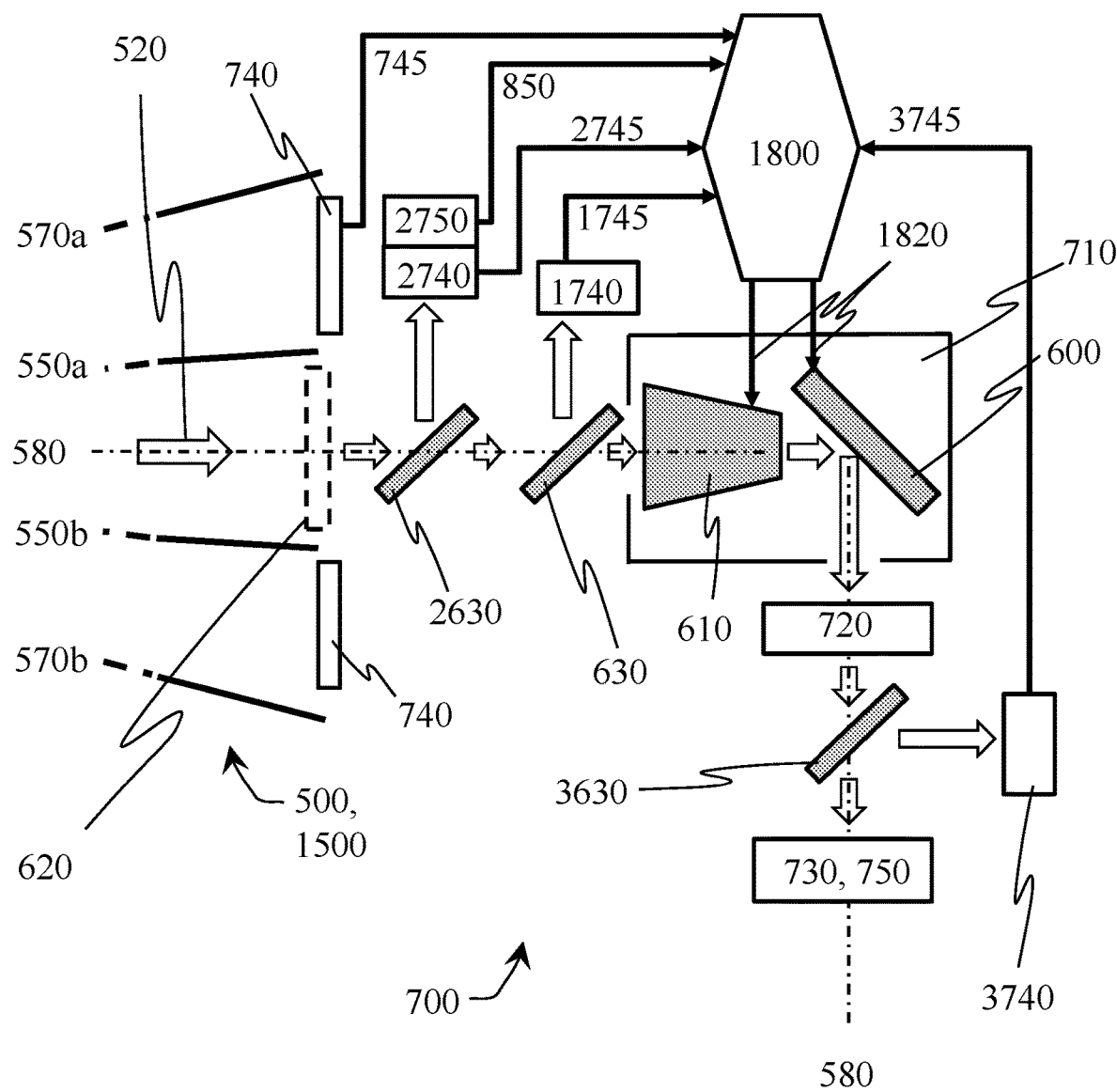
FIG. 3B schematically depicts an example of a receiver optical aligner.

FIG. 3B schematically depicts a receiver aperture and/or radiation window 620 comprised in the receiver. FIG. 3B further depicts:

an example of a Rx optical aligner 710, configured and arranged to vary one or more directional properties of the receiving optical communications 500 and/or alignment 1500 beam. In this example, the Rx optical aligner 710 comprises one or more variable optical elements 600, 610, configured and arranged to vary one or more directional properties of the receiving communications 500 and/or alignment 1500 beam.

The one or more directional properties of the receiving communications 500 and/or alignment 1500 beam may be selected from the group comprising: a beam angle, a beam width, a degree of collimation, a degree of divergence, a beam direction, a field-of-view, an intensity distribution in a radial cross-section, or any combination thereof.

In this example, the Rx optical aligner 710 further comprises:

an optional moveable mirror 600, configured and arranged to receive light from the variable field-of-view optical module 610. It is further configured and arranged to reflect at least a portion of the light received towards the one or more main radiation detectors 730.

The movable mirror 600 may be implemented using a motorized mirror in the same, similar or analogous way as described above for the moveable mirror 200 comprised in the Tx optical aligner 160.

In this example, the Rx optical aligner 710 further comprises:

a variable field-of-view optical module 610, configured and arranged to receive the light from the receiver aperture 620 and the optional receiving beam dividers 630, 2630, to reduce the receiving communications 500 and/or alignment 1500 beam and/or to vary the field of view of the receiving communications 500 and/or alignment 1500 beam. For example, it may be a multi-element beam expander with variable magnification ratio—by changing beam waist size, the divergence of the beam is also changed. Any suitable configuration may be used, including, for example, the same, similar or analogous configurations as described above for the variable divergence optical module 210 comprised in the Tx optical aligner 160.

In this example, the Rx directional controller 1800 is configured and arranged to generate one or more Rx optical configuration parameters 1820, and to provide the one or more configuration parameters 1820 to the moveable mirror 600 and/or the variable field-of-view optical module 610. These variable optical elements 600, 610 are provided with electrical motors and actuators to provide sufficient movement. For a Rx moveable mirror 600, a typical FSO system may require a few degrees of range. For a Rx variable divergence module 210, a change in divergence in the order of tens of µ rad may be sufficient.

FIG. 3B further depicts:

an optional first beam divider 630, such as a beam splitter, disposed in the beam path between the receiver aperture 620 and the variable field-of-view optical module 610. The first beam divider 630 is configured and arranged to allow a large portion of the receiving beams 500, 1500 passing through the receiver aperture 620, and to further direct a portion of the receiving beams 500, 1500 towards the second alignment detector 1740. For example, a 90/10% or 99/1% beam splitter may be used, where the lower percentage is directed towards the second alignment detector 1740.

an optional second alignment detector 1740, configured and arranged to receive a portion of the receiving beams 500, 1500 from the first beam divider 630 and to measure one or more energy parameters of the beam. The resulting receiver beam alignment data 1745 is provided to the Rx directional controller 1800.

Figure 4A:
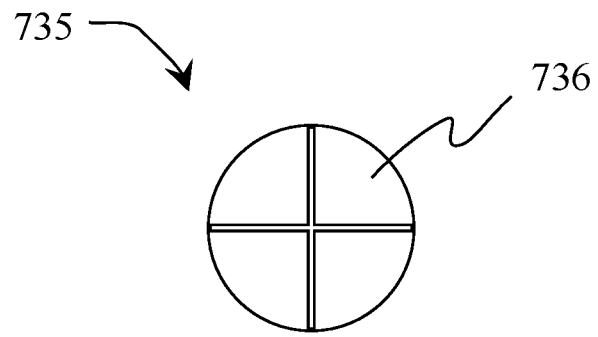
FIG. 4A depicts a segmented radiation detector.

For example, a segmented detector may be used, such the segmented radiation detector 735 depicted in FIG. 4A. The segmented radiation detector 735 comprises two or more radiation detector segments 736, for example four quadrants 736 as depicted, allowing both signal detection and alignment functionality. Each segment or quadrant 736 may be considered as a separate radiation detector when used for alignment. Operation may be similar to a quadrant or a quad photodiode, used conventionally to determine the position of a laser signal in optical pick-ups for CD/DVD systems. By comparing the signal levels detected in two or more segments or quadrants, a deviation of the radiation incident axis from the receiver optical axis 580 may be measured and/or estimated.

Alternatively, an array of photodetectors may be comprised in the receiver alignment detectors 1740 configured and arranged to receive low bitrate data as well as signal level/power (used for position detection)

Alternatively, a wavefront sensor may be used instead of a segmented detector.

FIG. 3B further depicts:

the optional first alignment detector 740, configured and arranged as an aperture detector—and depicted in longitudinal cross-section in FIG. 3B. The first alignment detector 740 is also depicted in plan view in FIG. 4B—in particular, it is the view from the outside of the receiver, looking towards the receiver aperture along the receiver optical axis 580.

Figure 4B:
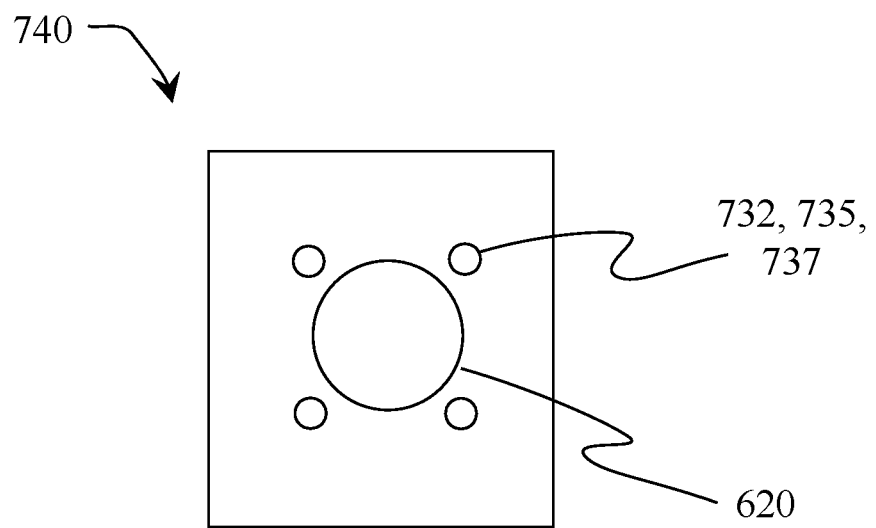
FIG. 4B depicts a plan view of an aperture alignment detector.

The first alignment detector 740 comprises:

the aperture or radiation window 620, configured and arranged centrally and symmetrically about the receiver optical axis 580 to allow one or more regions of the receiving communications 500 and/or alignment 1500 beam to pass through to the one or more detectors 730, 1740, 2740. The radiation window may be typically configured and arranged to allow the beam 500, 1500 to pass through it, but also to isolate the internal areas from the outer areas. The dimensions of the radiation window are primarily determined by the dimensions of the internal optics.

one or more radiation detectors 732, 735, 737, arranged at a further distance away from the receiver optical axis 580 than the extent of the aperture or radiation window 620. The number of secondary radiation detectors 740, and their configuration and arrangement depend on the degree of predictability with which the direction of the receiving communications beam 500 may be known and the expected degree of divergence. Four or more radiation detectors 740 may be provided in symmetrically around the radiation window 620, for example as depicted in FIG. 4B. In another example, four radiation detectors 740 may be provided, arranged symmetrically. The radiation detectors may be an individual detector 737, a segmented detector 735 (such as the segmented detector depicted in FIG. 4A), a detector array 732, and any combination thereof.

Additionally or alternatively to the one or more receiver alignment detectors 740, 1740, 2740, 3740, the main detector 730 may be configured and arranged to perform a degree of alignment if it comprises a segmented radiation detector—for example, the segmented detector 735 depicted in FIG. 4A. Alternatively, alignment may also be performed if the main detector 730 comprises a sufficiently dimensioned array of photodiodes.

FIG. 3B also depicts further elements comprised in the receiver 700:
- an optional second beam divider 2630, such as a beam splitter, disposed in the beam path between the receiver aperture 620 and the variable field-of-view optical module 610. The second beam divider 2630 is configured and arranged to allow a large portion of the receiving beams 500, 1500 passing through the receiver aperture 620 to pass through, and to further direct a portion of the receiving beams 500, 1500 towards the third alignment detector 2740. For example, a 90/10% or 99/1% beam splitter may be used, where the lower percentage is directed towards the third alignment detectors 2740;
- the third receiver alignment detector 2740, configured and arranged to receive a portion of the receiving beam 500, 1500 from the second beam divider 2630, and to measure one or more energy parameters of the deflected beam portion. The resulting third Rx alignment beam data 2745 is provided to the Rx directional controller 1800;
- the alignment demodulator 2750, for example, connected electrically to the third radiation detector 2740, and configured to retrieve the data (or information) encoded in the receiving alignment beam 1500 by the alignment modulator comprised in the transmitter as described above, including Tx directional data 850). In other example, one or more radiation detector 740, 1740, 2740, 3740 may be electrically connected to one or more alignment modulators, thereby providing one or more pieces of Tx directional data 850. Tx directional data 850 from more than one detector 740, 1740, 2740, 3740 may be compared as a means of error and/or disturbance detection.

FIG. 3B also depicts further elements comprised in the receiver 700:
- an optional third beam divider 3630, such as a beam splitter, disposed in the beam path between the variable field-of-view optical module 610 and the one or more main radiation detectors 630. The third beam divider 3630 is configured and arranged to allow a large portion of the receiving beams 500, 1500 passing through the Rx beam aligner 710 (and optional Rx beam conditioner 720) to pass through, and to further direct a portion of the receiving beam 500, 1500 towards the fourth alignment detector 3740. For example, a 90/10% or 99/1% beam splitter may be used, where the lower percentage is directed towards the fourth alignment detector 3740;
- an optional fourth alignment detector 3740, configured and arranged to receive a portion of the receiving beams 500, 1500 from the third beam divider 3630 and to measure one or more energy parameters of the beam. The resulting receiver alignment data 3745 is provided to the Rx directional controller 1800.

Measuring a degree of misalignment of the receiving beams 500, 1500 may proceed as follows:
- two or more alignment detectors 740, 1740, 2740, 3740 are provided at different dispositions along the receiver optical axis 580. The configuration and arrangement may be selected such that the radiation measurements at each of these detectors 740, 1740, 2740, 3740 may be used to determine a deviation of the radiation incident axis for the receiving beams 500, 1500 from the receiver optical axis 580.
- measuring the irradiance on the two or more detectors 740, 1740, 2740, 3740; and
- determining a deviation of the incident radiation from the receiver optical axis 580.

Using these alignment measurements, one or more corrections may be indicated and/or automatically applied using appropriate optical, electrical, mechanical and/or software means.

Optionally, one or more parameter of the transmitting beams 300, 1300 may be varied to assist during the alignment, such as beam width, collimation and/or beam direction, whereby a radial beam width of receiving beams 500, 1500 may be increased. Advantageously, the transmitter optical aligner 160 may be reconfigured to perform this variation during alignment.

With very low degrees of divergence and certain configurations, this additional step of temporarily creating a divergent beam with the transmitter optical aligner 160 should preferably be performed during alignment.

During an initial alignment, large variations in beam properties of the transmitting beams 300, 1300 may be used. For subsequent alignments, particularly for alignment during operation, smaller variations may be used and/or measurements at the receiver 700.

During installation, an initial coarse system alignment is performed. During system operation, one or more fine manual alignments may be performed—in some cases, it may be advantageous to align during data communication to reduce downtime as much as possible.

For two-way (or duplex) systems, where a transmitter and receiver are combined in a communication station or transceiver (see below), the initial alignment may need to be performed at both stations comprised in a communications link.

FIG. 9 depicts an example of coarsely aligning an optical communication system comprising an optical transmitter 100 and a communication receiver 700.

Figure 9A:
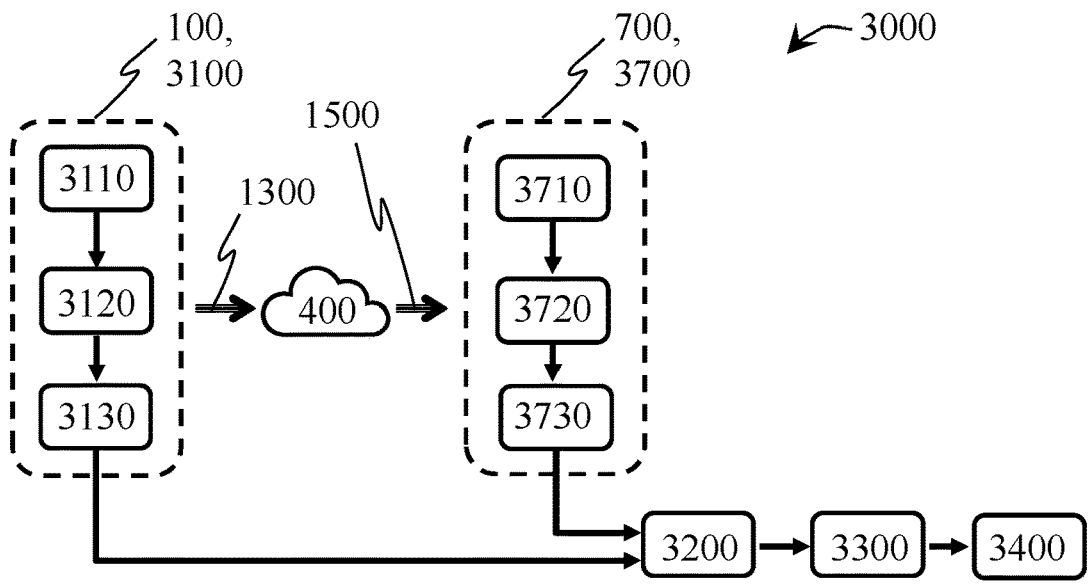
FIG. 9A depicts a method of coarsely aligning an optical communication system.

In particular FIG. 9A depicts a method 3000 of aligning an optical communication system, which may be advantageous after installation and/or maintenance. It comprises:
- mechanically mounting 3110 a transmitter 100 at a Tx location 3100 to a suitable structure. Preferably, the transmitter 100 is powered off during mounting 3110. Optionally, the transmitter 100 and/or mounting comprises one or more adjusters to provide a degree of displacement and/or rotation between one or more components of the transmitter 100 and the structure to which the transmitter 100 is mounted; and/or
- mechanically mounting 3710 a receiver 700 at an Rx location 3700 to a suitable structure. Preferably, the receiver 700 is powered off during mounting 3710. Optionally, the receiver 700 and/or mounting comprises one or more adjusters to provide a degree of displacement and/or rotation between one or more components of the receiver 700 and the structure to which the receiver 700 is mounted. The transmitter 100 and receiver 700 are separated by a communication channel 400.

After mounting, the method 3000 further comprises one or more pointing steps:

manually coarsely aligning 3120 the transmitter 100 based on the Rx location 3700, Rx altitude, Rx direction, Rx pitch, Rx roll, Rx yaw, or any combination thereof provided as Rx positional data (not depicted). In many cases, one or more Rx GPS (or similar) co-ordinates may be sufficient as these are typically known to a high degree of accuracy; and/or manually coarsely aligning 3720 the receiver 700 based on the Tx location 3100, Tx altitude, Tx direction, Tx pitch, Tx roll, Tx yaw, or any combination thereof provided as Tx positional data (not depicted). In many cases, one or more Tx GPS (or similar) co-ordinates may be sufficient as these are typically known to a high degree of accuracy.

After manually coarsely aligning based on the location of the complementary device, the method 3000 further comprises one or more additional pointing steps:

at least partially powering the transmitter 100 whereby Tx positional and/or movement data (not depicted) is generated 3130 and used to detect and/or measure a degree of alignment. For example, the state of one or more internal accelerometers may be measured and displayed in any suitable way, such as a series of LED's arranged in the shape of a cross. Preferably, the Tx positional and/or movement data is used to initially to align the transmitter 100—for example, displayed to assist manual fine alignment and/or provided to assist with an automated alignment such as displacement and/or rotation. Additionally or alternatively, one or more Tx optical configuration parameters (not depicted) may be generated 3130; and/or at least partially powering the receiver 700 whereby Rx positional and/or movement data (not depicted) is generated 3730 and used to detect and/or measure a degree of alignment. For example, the state of one or more internal accelerometers may be measured and displayed in any suitable way such as a series of LED's arranged in the shape of a cross. Preferably, the Rx positional and/or movement data is used to initially align the receiver 700—for example, displayed to assist manual alignment and/or provided to assist with an automated alignment such as displacement and/or rotation. Additionally or alternatively, one or more Rx optical configuration parameters (not depicted) may be generated 3730.

Manual fine alignment is preferred before starting regular operations to ensure that the initial positions are at approximately the center of the adjustment range.

Figure 9B:
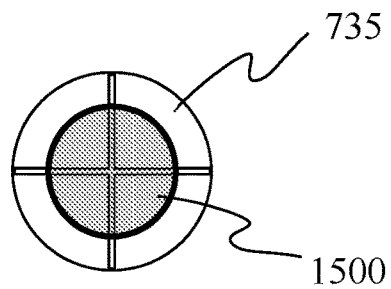
FIGS. 9B and 9C depict examples of beam alignment by allowing two different beam widths to be incident on a segmented radiation detector.
Figure 9C:
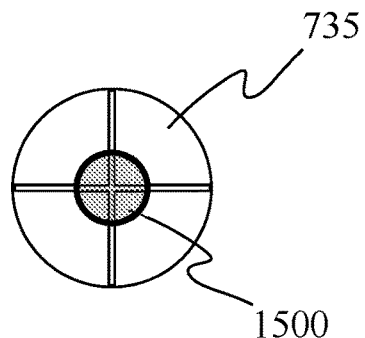

After aligning based on the own positional and/or movement data of a device, the receiver 700 may receive at least a detectable portion of the beam. So, the method 3000 further comprises one or more acquisition steps:

at least partially powering the transmitter 100 whereby at least a portion of transmitting alignment beam 1300 is transmitted towards the Rx location 3700. Additionally or alternatively, at least a portion of a transmitting communication beam (not depicted) may be configured and arranged to provide beam energy which may be used to detect and/or measure a degree of alignment; and/or at least partially powering the receiver 700 whereby at least a portion of a receiving alignment beam 1500 is received from the Tx location 3100. Additionally or alternatively, at least a portion of a receiving communication beam (not depicted) may be configured and arranged to receive beam energy which may be used to detect and/or measure a degree of alignment; and.

coarsely actively align 3200 based on energy received at the receiver 700 comprised in the portion of the receiving alignment beam 1500 and/or receiving communication beam (not depicted). No mechanical access should preferably be needed anymore;

After coarsely aligning to increase, and preferably maximize, a degree of energy received, the method 3100 further comprises one or more acquisition steps:

finely actively align 3300 using feedback from the energy received at the receiver 700. For example, as depicted in FIG. 9B, if the receiver 700 comprises one or more segmented radiation detectors 735, signals from two or more segments may be used to provide an indication of a deviation from the receiver optical axis (not depicted) of the receiving optical alignment beam 1500. By further displacing and/or rotating one or more components of the receiver 700, the initial alignment (pointing) may be improved; and/or additionally or alternatively, as depicted in FIG. 9C, a reduced beam width of the receiving alignment beam 1500 may be used to provide fine alignment 3300. signals from two or more segments may be used to provide an indication of a deviation from the receiver optical axis (not depicted) of the receiving optical alignment beam 1500. In general, using reduced beam widths may further increase the accuracy of degree of alignment.

After finely aligning to increase, and preferably maximize, a degree of energy received and the degree of coincidence between the receiving beam direction (not depicted) and an Rx optical axis 580, the method 3000 further comprises:

switching 3400 to an operating mode whereby data communication and automated alignment are possible.

One or more degrees of alignment may be continuously monitored using the radiation detectors 730, 740, 1740, 2740, 3740 and if they exceed one or more predetermined thresholds, for example, as a result of excessive system sway beyond the capabilities of the normally running active alignment system, the initial manual alignment may need to be repeated or repeated to a lower degree.

Additionally or alternatively, a further beam may be used for alignment. The optical transmitter 100 and receiver 700 described herein may further comprise additional radiation sources, optical components and detectors to provide such an alignment beam. This has the advantage that the further alignment beam 1300, 1500 may be optimized separately (for alignment) from the communication beam 300, 500 (which may be optimized for communication).

Alternative embodiments may include:

one beam carrying TX directional data concerning its own position and characteristics as described above. The beam may be both a data beam and a beacon beam, for example.

one beam carrying digital information concerning its own position and multiple other beams: for example, an alignment beam may be used to determine alignment and to transfer information about alignment (and other system aspects). Additionally, one or more data beams may be provided for high-speed data communication. By having different beams operating at different speeds, a high divergence beam may be used for the alignment and still have sufficient power at the receiver (due to longer integration time at radiation detector, meaning that less power needs to be received). For the high-speed data channel, a less diverging beam may be used, meaning that more power is received, which is also preferred due to the shorter integration time.

Additionally, having an alignment beam which can tolerate more power loss is helpful in high atmospheric attenuation conditions. The alignment between the units may be maintained even if high speed data communication cannot be established or cannot be established continuously.

multiple beams, each carrying information concerning their own position and/or characteristics: This may be advantageous, for example, where beams are transmitted from different apertures in the same enclosure.

multiple beams each carrying information concerning their own position/characteristics and the position/characteristics of multiple other beams: For example, by applying spatial diversity techniques, i.e. two or more links (transceiver pairs), to connect two networks. If one link loses connection, the information regarding all beams may be carried on the remaining link(s). These links could be established by having multiple apertures in the same enclosure, for example, or having separate enclosures. Separate enclosures may be preferred, as that is the most flexible concerning network infrastructure.

Such an alignment beam may also be used to measure one or more degrees of disturbance in the channel 400, such as the atmosphere.

Additionally or alternatively, a portion of the communication beam 300, 500 disclosed herein may be used as an alignment beam. For example, a beam splitter may be used to generate a secondary communication beam that may be primarily configured and arranged for alignment.

Any flow charts and descriptions thereof herein should not be understood to prescribe a fixed order of performing the method steps described therein. Rather the method steps may be performed in any order that may be practicable. Similarly, the examples are used to explain the algorithm, and are not intended to represent the only implementations of these algorithms—the person skilled in the art will be able to conceive many different ways to achieve the same functionality as provided by the embodiments described herein.

One or more computational elements (such as a processor and or a data storage), may be comprised within the transmitter, receiver, or any combination thereof.

Additionally or alternatively, one or more computational elements (such as a processor and/or data storage) may be provided on one or more servers, wherein the one or more servers are in data communication with the transmitter, receiver, one or more further servers, or any combination thereof.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

For example, most of the examples given relate to Free Space Optics (FSO) for ground-to-ground use. However, the skilled person will realize that an optical transmitter providing a more reliable and/or accurate communication beam may also be used with any other suitable communication channel, such as ground-to-space, space-to-ground and space-to-space communication. Variations in channel characteristics may be anticipated in the configuration and arrangement—for example, indoor or outdoor use have different degrees of atmospheric disturbance. A in increase in reliability and/or accuracy may reduce the number and complexity of repeaters conventionally required in such a channel.

The transmitter 100 and receiver 700 are usually optimized for parameters such as the type of communication required, the desired bit error ration (BER), the nature and length of the communication channel 400, any expected range-limiting factors such as fog, beam dispersion, pollution, atmospheric dispersion, positional stability of the transmitter & receiver (particularly in wind) and interference.

If two-way communication is to be provided, a further embodiment of a communication system may be provided using two or more communication stations 420a, 420b as depicted in FIG. 6.

Figure 6A:
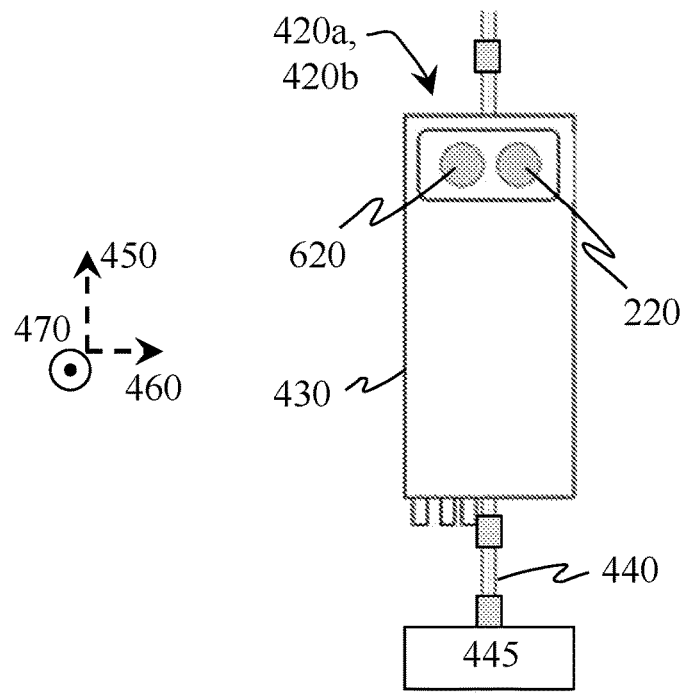
FIG. 6A depicts a plan view of a communication station.

FIG. 6A depicts a plan view of a communication station 420, comprising both transmitter and receiver functionality—in other words, the station 420a, 420b may be configured and arranged to operate as a transmitter 100 and/or as a receiver 700.

The transmitter 100 and receiver 700 functionality is comprised within a communication station enclosure 430, configured and arranged to protect the components and elements of the transmitter/receiver 100/700 from unwanted environmental influences, such as excess cold, excess heat, excess moisture, and any combination thereof.

The enclosure 430 depicted in FIG. 6A is longitudinally extended along a longitudinal axis 450, transversely extended along a first transverse axis 460, and transversely extended along a second transverse axis 470. The first transverse axis 460 is approximately perpendicular to the longitudinal axis 450. The second transverse axis 470 is approximately perpendicular to both the longitudinal axis 450 and the first transverse axis 460. In general, the communication stations 420a, 420b may be installed in many different configurations, and the enclosure 430 may have any suitable size, shape, orientation or shape. The axes 450, 460, 470 are mainly introduced here to allow the different views to be compared with each other.

FIG. 6A is a plan view (or front view) in a viewing plane comprising the longitudinal axis 450 and the first transverse axis 460, with the positive direction of the longitudinal axis 450 being nominally bottom to top, as depicted, and the positive direction of the first transverse axis 460 being nominally left to right, as depicted. The positive direction of the second transverse axis 470 is nominally out of the paper, as depicted. In use, transmitting optical beams 300,1300 (depicted in FIG. 6C) are emitted along the positive direction of the second transverse axis 470, which is also depicted nominally as being out of the paper. In use, receiving optical beams 500, 1500 (depicted in FIG. 6C) are received along the negative direction of the second transverse axis 470, which is depicted nominally as being into the paper.

The enclosure 430 comprises a transmitter (Tx) aperture and/or radiation window 220 and an adjacent receiver (Rx) aperture and/or radiation window 620. Preferably radiation windows are used to provide a higher degree of protection to the components and elements within the enclosure 430. In this example, the Tx radiation window 220 and Rx radiation window 620 are disposed at approximately the same position along the longitudinal axis 450, and at different positions along the first transverse axis 460.

The communications station 420a, 420b is mounted to a suitable communication station support 440, such as a pole 440, which is attached to a suitable communication station base 445, such as an antenna tower or a building. Preferably, the communication station support 440 is rigidly attached to the communication station base 445. Alternatively, the communication station 420a, 420b may be directly attached to the communication station base 445.

Figure 6B:
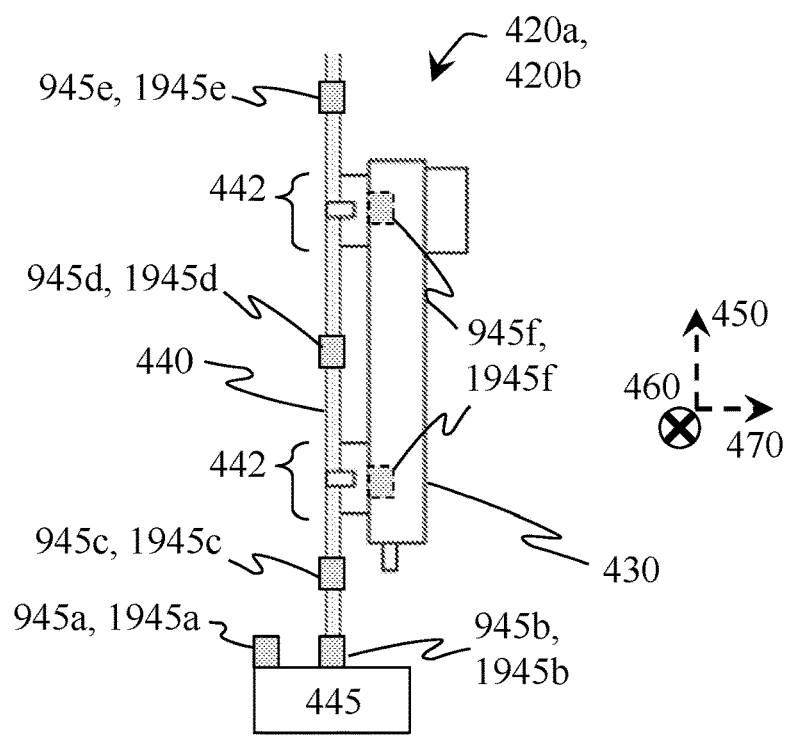
FIG. 6B depicts a further plan view or side view of a communication station.

FIG. 6B depicts a further plan view (side view) in a viewing plane comprising the longitudinal axis 450 and the second transverse axis 470, with the positive direction of the longitudinal axis 450 being nominally bottom to top, as depicted, and the positive direction of the second transverse axis 470 being nominally left to right, as depicted.

In this example, the enclosure 430 is further configured and arranged to rigidly mount the enclosure 430 to the communication station support 440 using one or more communication station mounts 442. Preferably, these mounts 442 are rigidly attached to the enclosure 430.

FIG. 6B further depicts one or more Tx and/or Rx movement sensors 945/1945—these are configured and arranged to measure disposition, speed and/or acceleration at one or more sensor positions on one or more structures which may affect alignment between a transmitter/receiver pair. For example, at one or more sensor positions 945a, 1945a on the communications station base 445, at an attachment point 945b, 1945b between the communication station base 445 and the communication station support 440, one or more sensor positions 945c, 1945c, 945d, 1945d, 945e, 1945e on the communications station support 440, one or more sensor positions at the communication station mounts 442, one or more sensor positions 945f, 1945f proximate the communication stations mounts 442, one or more sensor positions within the enclosure, or any combination thereof.

As depicted, it may be convenient to provide one or more movement sensors within the enclosure 430, such as the one or more sensor positions 945f, 1945f proximate the communication stations mounts 442. They should be preferably as close as possible to the optical baseboard, since the movement of that baseboard will determine alignment.

To send directional data, at least one parameter relating to an orientation of the transmitter is preferably known. Also, to calculate errors in received signals, at least one parameter relating to an orientation of the receiver is preferably known.

Suitable sensors which may be used include position sensors, motion sensors, proximity sensors, accelerometers, tilt sensors, inclinometers, or any combination thereof. Sensors may use any suitable physical or optical phenomenon for the detection, including electrical resistance, induction, eddy-currents, capacitance, hall-effect, optics, ultrasonics, magnetorestriction, photo-detection or any combination thereof.

A multiple axis sensor, such as a 3-axis or 6-axis accelerometer, may be used. Sensors similar to those used in smartphones and fitness trackers are sufficiently compact and accurate enough to be integrated within the communication unit 420a, 420b.

Figure 6C:
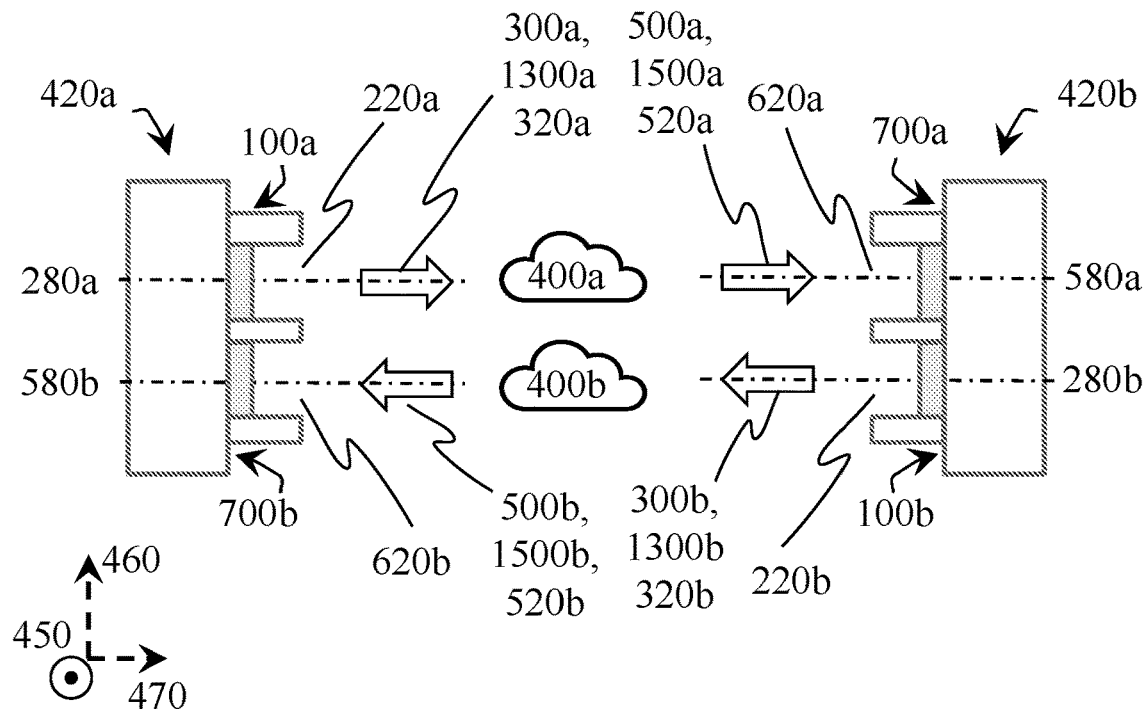
FIG. 6C depicts a transverse cross-section through radiation windows of a communication station.

FIG. 6C depicts a transverse cross-section through the radiation windows 220ab, 620ab of a first communication station 420a and a second communication station 420b. The plane of the transverse cross-section comprises the first transverse axis 460 and the second transverse axis 470, with the positive direction of the first transverse axis 460 being nominally bottom to top, as depicted, and the positive direction of the second transverse axis 470 being nominally left to right, as depicted.

The first communication station 420a comprises:
a first optical transmitter 100a, configured and arranged to produce at least one optical transmitting beam 300a, 1300a configured and arranged to pass through a first Tx radiation window 220a and communicate with a first communication receiver 700a; and
a second communication receiver 700b, configured and arranged to receive at least a portion 500b, 1500b of at least one second optical transmitting beam 300b, 1300b through an Rx receiving aperture 620b, produced by a second optical transmitter 100b.

The first communication station 420a comprises a Tx directional controller inside the enclosure, configured and arranged: to determine and/or receive at least one Tx pointing direction 320a of at least one transmitting communications beam 300a and/or at least one alignment beam 1300a.

The first communication station 420a comprises an Rx directional controller inside the enclosure, configured and arranged to receive Tx directional data by demodulation of at least one receiving beam 500b, 1500b, and to receive measurement data associated with the at least one receiving beam 500b, 1500b, such as a receiving beam direction 520b.

The second communication station 420b comprises:
the second optical transmitter 100b, configured and arranged to produce the at least one second optical transmitting beam 300b, 1300b, passing through a further Tx aperture window 220b and
the first communication receiver 700a, configured and arranged to receive at least a portion 500a, 1500a of the at least one first optical transmitting beam 300a, 1300a through a further Rx aperture windows 620b, produced by the first optical transmitter 100a.

The second communication station 420b comprises a Tx directional controller inside the enclosure, configured and arranged to determine and/or receive at least one Tx pointing direction 320b of at least one transmitting communications beam 300b and/or at least one alignment beam 1300b.

The second communication station 420b comprises an Rx directional controller inside the enclosure, configured and arranged to receive Tx directional data by demodulation of at least one receiving beam 500a, 1500a, and to receive measurement data associated with the at least one receiving beam 500a, 1500a, such as a receiving beam direction 520a.

The at least one transmitting beam 300a, 1300a provided by the first transmitter 100a may be substantially the same, similar, different or substantially different to the at least one transmitting beam 300b, 500b provided by the second transmitter 100b.

In this case, the first transmitter 100a and first receiver 700a are separated by a first communication channel 400a, and the second transmitter 100b and second receiver 700b are separated by a second communication channel 400b.

This may be used to provide two-way communication between the first communication station 420a and the second communication station 400b. In other words, operated in half-duplex and/or full-duplex modes using the two one-way communication channels 400a, 400b.

During installation of the communication station 420a, 420b, the longitudinal axis 450 of the enclosure 430 is preferably mounted approximately vertical. Similarly, the first 460 and/or second 470 transverse axes are preferably mounted approximately horizontally.

By measurement, simulation and/or extraction from CAD data, one or more values of Tx positional data 930 and/or Rx positional data 1930 relating to the physical installation may be predetermined before use and/or controlled during use. By including both a transmitter 100 and receiver 700 in the enclosure 430, optimization of the physical installation positions and orientations for both transmitter 100 and receiver 700 functionality may not be possible in practice— however, one or more values may be taken into account when setting up and/or using the communications station 420*a*, 420*b*.

It may be convenient to consider the values in relation to the relative alignment of the Tx optical path 280*a*, 280*b* and the Rx optical path 580*a*, 580*b*. For example:

- a Tx and/or Rx location associated with the transmitter 100 and/or receiver 700 location, such as a geographic co-ordinate, a longitude, a latitude, a radionavigation co-ordinate, a satellite-based co-ordinate, a GPS co-ordinate, a GLONASS co-ordinate, a Galileo co-ordinate, a BeiDou co-ordinate, a NAVIC, a QZSS co-ordinate, a WiFi network ID, a mobile phone cell tower ID, a radio beacon, a Bluetooth beacon, or any combination thereof;
- a Tx and/or Rx altitude associated with the Tx radiation window 220 and/or Rx radiation window 620. This may be estimated as approximately a height of the communication stations base 445 added to a mounting height of the communication station 420*a*, 420*b*. Relative height above the ground may also be used instead of altitude;
- a Tx and/or Rx direction associated with a difference between the Tx and Rx locations. This may be expressed as a magnetic compass direction, for example;
- a Tx and/or Rx pitch associated with a deviation of the second transverse axis 470 of the enclosure from horizontal due to a degree of rotation around the first transverse axis 460 This may also be called tip;
- a Tx and/or Rx roll associated with a deviation of the first transverse axis 460 of the enclosure from horizontal due to a degree of rotation around the second transverse axis 470. This may also be called tilt;
- a Tx and/or Rx yaw associated with a deviation from the nominal Tx/Rx direction due to a degree of rotation around the longitudinal axis 460.

In order for the Tx directional controller 800 to more accurately determine the Tx pointing direction 320*a*, 320*b*, it may be advantageous to take into account Tx movement data 935 which may influence relevant orientations of the transmitter 100*a*, 100*b*. By ensuring that the transmitter 100*a*, 100*b* has a sufficient degree of awareness of its own orientation (with respect to the respective receiver 700*a*, 700*b*), acquiring and alignment may take longer or be less accurate.

Similarly, it may be advantageous for the receiver 700*a*, 700*b* to take into account Rx movement data 1935 which may influence relevant orientations of the receiver 700*a*, 700*b*. By ensuring that the receiver 700*a*, 700*b* has a sufficient degree of awareness of its own orientation (with respect to the respective transmitter 100*a*, 100*b*), acquiring and alignment may take longer or be less accurate. In addition, if the receiver 700*a*, 700*b* is insufficiently aware of its orientations, it may be difficult to distinguish between different types of alignment errors such as steering errors, swaying errors or turbulence errors.

During operation of the communication station 420*a*, 420*b*, one or more values of Tx movement data 935 and/or Rx movement data 1935 relating to mechanical and physical properties of the installation and the influence of the environment may detected and/or measured during use. By including both a transmitter 100 and receiver 700 in the enclosure 430, optimization of the positions and orientations for both transmitter 100 and receiver 700 functionality may not be possible in practice—however, one or more values may be taken into account when setting up and/or using the communications station 420*a*, 420*b*.

It may be convenient to consider the values in relation to the relative alignment of the Tx optical path 280 and the Rx optical path 580. For example:

- a Tx and/or Rx disposition, Tx and/or Rx speed, Tx and/or Rx acceleration, Tx and/or Rx rotation, Tx and/or Rx heave, Tx and/or Rx sway, Tx and/or Rx surge associated with the transmitter 100 and/or receiver 700 installation.

In some configurations, it may be useful to collect a large number of values, such as disposition, rotation and/or movement data as this would allow the data to be further processed, for example, isolating frequency domain data may allow vibrations to be measured.

Conventional FSO communication stations are configured and arranged to be mounted with their longitudinal extension approximately horizontally—in other words, the optical paths of the transmitter and receiver are also approximately horizontal.

However, the inventors have realized that this may be disadvantageous—it is often difficult to rigidly mount a horizontally-oriented transmitter/receiver to a vertical structure, such as an antenna tower or a mast. The horizontal distribution of the mass may make conventional communication stations more sensitive to vibrations, wind, twisting and swaying, resulting in alignment errors.

The communication station 420*a*, 420*b* depicted in FIG. 6 is particularly advantageous due to vertical mounting of the longitudinally-extended enclosure 430, providing a substantially vertical distribution of the mass of the optical components. By providing one or more beam deflectors, for example as depicted in FIG. 2B and/or FIG. 3B, the optical path of the transmitter 100 and/or receiver 700 may comprise a relatively short section proximate the radiation window 220, 620 (to be oriented approximately horizontally after installation), and a significantly longer portion disposed along the longitudinally-extended enclosure 430 (to be oriented approximately vertically after installation). This may reduce the sensitivity to movement, and may reduce alignment errors in use. This will be particularly advantageous for the optical baseboard—by mounting it vertically instead of horizontally, a large cantilever is avoided which may cause baseboard deflection and possible alignment errors.

Figure 6D:
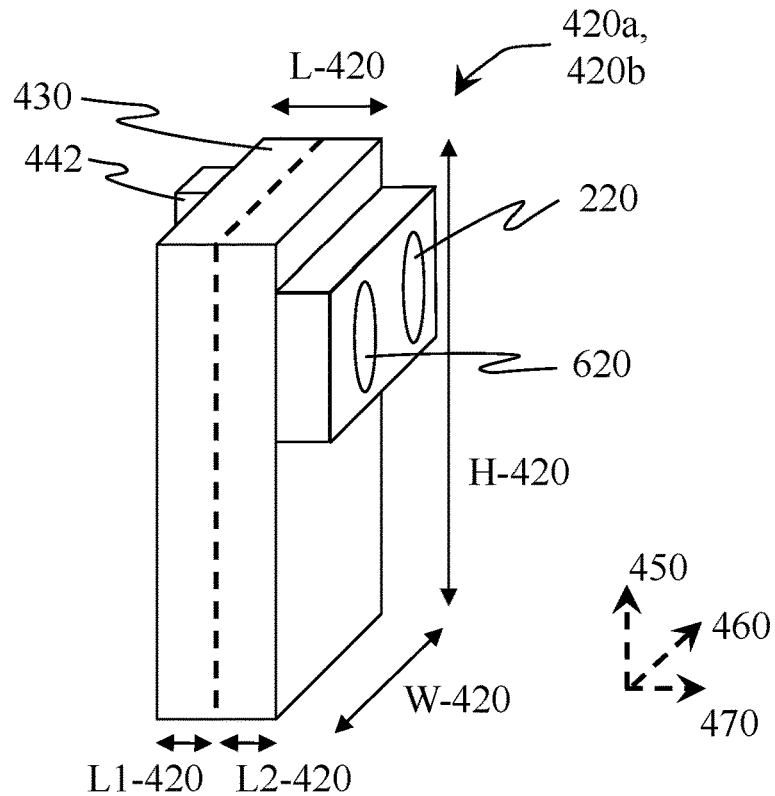
FIG. 6D depicts a 3D view of the outside of the communications station enclosure proximate the aperture windows.

More particularly, as depicted in FIG. 6D, the enclosure 430 may be extended:

- longitudinally along the first axis 450, with a height H-420;
- transversely along the second axis 460, with a width of W-420; and
- transversely along the third axis 470, with a length of L-420.

The enclosure 430 comprises one or more communication station mounts 442 is configured and arranged to be mounted to a suitable communication support (not depicted in FIG. 6D) whereby the longitudinal extension H-420 along the first axis 450 is approximately vertical, the transverse extension W-420 along the second axis 460 is approximately horizontal, and the transverse extension L-420 along the third axis 470 is approximately horizontal.

Sensitivity to movement may be reduced by L-420 being less than or equal to W-420; and H-420 being greater than or equal to 2×W-420.

Sensitivity to movement may be further reduced by concentrating the mass of the communication station 420*a*, 420b as close as possible to the side of the enclosure 430 proximate the one or more communication station mounts 442.

Sensitivity to movement may be further reduced by considering the length L-420 to consist of two portions: L1-420 and L2-420. In other words, L-420 is equal to L1-420 plus L2-420. The first portion L1-420 is proximate the one or more communication station mounts 442, the second portion L2-420 is proximate the Tx aperture/window 220, and the second portion L2-420 is proximate the Rx aperture/window 620. Fifty-percent or more of the mass of the communication station 420a, 420b is comprised within the volume of the enclosure 430 defined by the dimensions L1-420, W-420 and H-420. This volume is proximate the one or more communication station mounts 442. Sensitivity to movement may be still further reduced by configuring and arranging the volume of the enclosure 430 such that L1-420 is less than or equal to half of the length L-420.

Additionally, electrical and optical fiber connections may be oriented with their axes approximately along the longitudinal axis 450 of the enclosure 430, allowing substantially vertically aligned connections after installation, which may further increase the positional stability of the communications station 420a, 420b.

Optionally, it may be advantageous to provide extended (or tube-like) Tx/Rx apertures in front of the Tx/Rx radiation windows 220/620 to further protect the optical components. This is depicted in the transverse cross-section of FIG. 6C. In some locations, devices that have an external appearance similar to a camera are subject to vandalism, including shooting from the ground at the radiation windows. Additional protection may be provided by the tubular apertures, which allows the radiation windows 220/620 to be recessed from the outer surfaces.

Still further protection from shooting may also be provided by comprising baffles or grooves in the walls of the tubular apertures 220/620. A further advantage of baffles and/or grooves is that they may be fluidly connected to one or more draining outlets whereby any moisture or precipitation that has been caught is drained away from the optical components.

A further advantage of the extended enclosure 430 for vertical mounting is that it can be made bigger than with those for horizontal mounting because the longitudinal extent is less likely to cause unwanted positional instability and/or movement. This may allow a simpler and less expensive internal design.

Other advantageous combinations of features may include:
A communication system comprising:
an optical transmitter 100 as described herein, configured and arranged to produce an optical communications beam 300; and
a communication receiver, comprising one or more main radiation detectors 730 configured and arranged to detect one or more regions of the communication optical beam 300, 500 produced by the optical transmitter 100.

This provides a high degree of compatibility, because the improved optical transmitter 100 described herein may communicate with conventional receivers which are not configured and arranged to demodulate the Tx directional data 850 and/or not configured and arranged to make use of the Tx directional data 850.

The embodiments described above may be advantageously configured and arranged to characterize weather.

For example, Tx movement data 935 may be provided from movement sensors, such as from one or more Inertial Measurement Units (IMU) (900,1900). Based on this Tx movement data 935, vibration and twist/sway of the Tx enclosure may be measured. The magnitude of these measurements is expected to be strongly correlated to the weather—for example, heavy winds may cause larger twist/sways.

Similarly, by measuring peak and average received energy at a receiver 700, continuous attenuation (e.g. due to fog) may be distinguished from signal fades (e.g. due to turbulence and/or pointing errors). Combining this with measured information about the alignment of the system, such as Tx directional data 850 and/or one or more Rx receiving beams directions 520, may allow the kind of weather during operation to be characterized.

Based on this characterization, system configuration parameters or system operation modes, such as one or more Tx optical configuration parameters 820 and/or one or more Rx optical configuration parameters 1820, may be set or modified.

Examples for system operation modes may be: normal operation (medium divergence, low power), heavy wind (high divergence) and heavy fog (low divergence, high power). It may be advantageous to define a multitude of operation modes to provide for optimized performance in a multitude of conditions.

Based on the system and algorithm design as described herein, link loss may occur under more extreme conditions. In such a case, the system may be configured, for example, to optimize link (re-)acquisition speed.

The transmitter may be further configured and arranged to transmit any other data relevant for the receiver. For example, system management data, such as link status, system temperature or any other parameter related to the simple network management protocol (SNMP). This may be advantageous if data is available to the transmitter through an external network that is not available to the receiver—for example, if the receiver is not connected to an external network. This may also be advantageous when two transceivers are configured and arranged to operate in duplex mode.

Optionally, it may be advantageous to modulate the communications beam 300 to transmit at least one pointing direction 320. In other words, data encoded in the at least one communications beam 300 may correspond to one or more alignment-related characteristic of the same beam and/or another beam emitted by the transmitter.

This may be particularly advantageous if the transmitter 100 is configured and arranged to emit one or more communications beams 300.

This may also be particularly advantageous if no separate and/or dedicated alignment beam is emitted by the transmitter 100.

In that case, the transmitter 100 may comprise:
a first communications radiation source 110, configured and arranged to provide a first optical communications beam 300;
a communications modulator 120, configured and arranged to receive data and to vary one or more properties of the optical communications beam 300 corresponding to data to be communicated;
a transmitter data controller 1000, configured and arranged to receive information to be communicated 1020, to convert the information 1020 to communication data 1050, and to provide the communication data 1050 to the communications modulator 120;

a transmitter directional controller 800, configured and arranged to determine at least one pointing direction 320 of the first optical communications beam 300, to convert the at least one pointing direction 320 to transmitter directional data 850, and to provide the transmitter directional data 850 to the communications modulator 120;

whereby, in use, data is encoded in the optical communications beam 300 by the communications modulator 120, the data including communication data 1050 and transmitter directional data 850.

Many conventional telecommunication modulators comprise a single input. In such a case, two or more sources of data may need to be combined/framed.

Reference Numbers Used in Drawings

100 an optical communication transmitter (Tx), e.g. an FSO transmitter
110 a communication radiation source, e.g. a laser source
120 a communications modulator
140 a communications beam conditioner
150 a beam generator and/or beam combiner
160 a transmitter optical aligner
200 a transmitter (Tx) moveable mirror
210 a transmitter (Tx) variable divergence optical module
220 a transmitter (Tx) aperture and/or radiation window
280 a transmitter (Tx) optical axis
300 a transmitting optical communications beam, suitable for FSO
320 a transmitter (Tx) beam pointing direction of the first optical communications beam and/or of the first optical alignment beam
350ab a transmitting beam with low divergence
370ab a transmitting beam with high divergence
400 a communication channel, e.g. an FSO channel
420ab one or more communication stations or transceivers
430 a communication station enclosure
440 a communication station support
442 a communication station mounts
445 a communication station base
450 a longitudinal axis
460 a first transverse axis
470 a second transverse axis
500 a receiving optical communications beam, suitable for FSO
520 a receiving beam direction
550ab a receiving beam with low divergence
570ab a receiving beam with high divergence
580 a receiver (Rx) optical axis
600 a receiver (Rx) moveable mirror
610 a receiver (Rx) variable field-of-view optical module
620 a receiver (Rx) aperture and/or radiation window
630 first beam divider, e.g. a beam splitter
700 an optical communication receiver (Rx), e.g. an FSO receiver
710 a receiver (Rx) optical aligner
720 a receiver (Rx) beam conditioner, e.g. to focus the beam
730 one or more main radiation detectors, e.g. an avalanche photodiode
732 a detector array
735 a segmented radiation detector
736 a radiation detector segment
737 an individual detector
740 first receiver (Rx) alignment detector
745 first receiver (Rx) alignment data
750 a communications demodulator, e.g. data and clock recovery
800 a transmitter (Tx) directional controller
810 a transmitter (Tx) turbulence estimator
820 one or more transmitter (Tx) optical configuration parameters
850 transmitter (Tx) directional data
860 transmitter (Tx) atmospheric data
863 real-time weather data
865 forecast weather data
867 historical weather data
900 transmitter (Tx) positional and/or movement data
910 transmitter (Tx) positional and/or movement estimator
930 transmitter (Tx) positional data
935 transmitter (Tx) movement data
937 forecast transmitter (Tx) movement data
945 one or more transmitter (Tx) movement sensors
950 historical transmitter (Tx) positional and/or movement data
1000 a transmitter (Tx) data controller
1020 information to be communicated by transmitter
1050 transmitter (Tx) communication data
1300 a transmitting optical alignment beam
1310 an alignment radiation source, e.g. a laser source
1320 an alignment modulator
1340 an alignment beam conditioner
1500 a receiving optical alignment beam
1740 second receiver (Rx) alignment detector
1745 second receiver (Rx) alignment data
1800 a receiver (Rx) directional controller
1810 a receiver (Rx) turbulence estimator
1820 one or more receiver (Rx) optical configuration parameters
1860 receiver (Rx) atmospheric data
1900 receiver (Rx) positional and/or movement data
1870 receiver (Rx) feedback data
1910 receiver (Rx) positional and/or movement estimator
1930 receiver (Rx) positional data
1935 receiver (Rx) movement data
1937 forecast receiver (Rx) movement data
1945 one or more receiver (Rx) movement sensors
1950 historical receiver (Rx) positional and/or movement data
2000 a receiver (Rx) data controller
2400 a temperature contour between the communication channel and the ground
2401-2410 typical disturbances that are more likely to be considered major
2420 one or more regions of local turbulence
2430 a direction of a prevailing wind
2630 second beam divider, e.g. a beam splitter
2740 third receiver (Rx) alignment detector
2745 third receiver (Rx) alignment data
2750 an alignment beam demodulator
3000 a method of aligning an optical communication system
3100 a transmitter (Tx) location
3110 mount a transmitter at a Tx location
3120 coarsely align based on Rx location
3130 coarsely align based on Tx directional data
3200 coarsely align based on readouts using alignment beam
3300 finely align
3400 switch to an operating mode allowing communication 3630 third beam divider, e.g. a beam splitter
3700 a receiver (Rx) location
3710 mount a receiver at an Rx location
3720 coarsely align based on Tx location
3730 coarsely align based on Rx directional data
3740 fourth receiver (Rx) alignment detector
3745 fourth receiver (Rx) alignment data

The invention claimed is:

1. An optical communication receiver for receiving at least one first optical communications beam and for further receiving at least one first optical alignment beam comprising data to be decoded by demodulation, the data including transmitter directional data;
wherein the receiver comprises:
one or more radiation detectors, configured and arranged to measure at least one characteristic of the at least one first optical communications beam and/or at least one first optical alignment beam;
at least one demodulator, connected electrically to the one or more radiation detectors, configured and arranged to at least partially retrieve the transmitter directional data encoded in the at least one optical alignment beam; and
a receiver directional controller, configured and arranged to receive transmitter directional data from the at least one demodulator and to receive measurement data from the one or more radiation detectors associated with the at least one beam characteristic;
wherein the transmitter directional data comprises predictive data associated with the one or more beam characteristic;
wherein the receiver directional controller is further configured and arranged to determine one or more differences between the predictive beam data and the receiver measurement data,
wherein the at least one beam characteristic is at least one receiving beam directional property of the at least one first optical communications beam and/or the at least one first optical alignment beam; and
wherein the receiver directional controller is further configured and arranged to determine a degree of beam misalignment based on the one or more differences between the predictive beam data and the receiver measurement data.

2. The optical receiver according to claim 1, wherein the at least one receiving beam directional properties corresponds to one or more properties of the at least one first optical communications beam and/or of the at least one first optical alignment beam selected from the group comprising:
at least one receiving beam direction, a beam angle, a beam width, a degree of collimation, a degree of divergence, a field-of-view, an intensity distribution in a radial cross-section, a total beam power, a laser wavelength, a laser line width, an optical amplifier power, a beam quality or any combination thereof.

3. The optical receiver according to claim 1, wherein the at least one beam characteristic is associated with a perturbation in the at least one first optical communications beam and/or the at least one first optical alignment beam due to one or more environmental parameters in the communication channel between the receiver and the source of the at least one first optical communications beam and/or the source of the at least one first optical alignment beam.

4. The optical receiver according to claim 3, wherein the at least one beam characteristic is associated with an atmospheric turbulence, a wind velocity, a humidity, an air pressure, an air flow, a temperature, a precipitation, a weather parameter, or any combination thereof.

5. The optical receiver according to claim 3, wherein the at least one beam characteristic is associated with a twist and/or sway of the receiver, of the source of the at least one first optical communications beam, of the source of the at least one first optical alignment beam, or any combination thereof.

6. The optical receiver according to claim 1, wherein the receiver is further configured and arranged:
to measure an energy at a plurality of points within at least a portion of the at least one first optical communications beam and/or of the at least one first optical alignment beam;
to estimate the position of a transverse cross-sectional center of the at least one first optical communications beam and/or of the at least one first optical alignment beam; and
to provide the position of a transverse cross-sectional center as the receiver measurement data to the receiver directional controller for determining a degree of beam misalignment.

7. The optical receiver according to claim 1, wherein the receiver is further configured and arranged:
to measure an energy at a plurality of points within at least a portion of the at least one first optical communications beam and/or of the at least one first optical alignment beam;
to estimate an angle of the at least one first optical communications beam and/or of the at least one first optical alignment beam; and
to provide the angle as the receiver measurement data to the receiver directional controller for determining a degree of beam misalignment.

8. The optical receiver according to claim 1, wherein the receiver comprises:
two or more alignment detectors, disposed at different positions along a receiver optical axis;
wherein the two or more alignment detectors are configured and arranged such that comparison of the radiation measurements at each of these two or more detectors indicates a beam direction and/or a beam angle associated with at least one first optical communications beam and/or at least one first optical alignment beam.

9. The optical communication receiver according to claim 8, wherein the two or more alignment detectors comprise one or more radiation detectors disposed proximate an aperture or radiation window.

10. The optical communication receiver according to claim 1, wherein the communication receiver comprises a communications demodulator, connected electrically to the one or more radiation detectors, configured and arranged to at least partially retrieve data encoded in the communication beam by the communications modulator of the transmitter.

11. A method of aligning an optical communication system, comprising:
providing a transmitter, configured and arranged to measure movement of the transmitter after mounting;
mechanically mounting the transmitter at a Tx location to a first suitable structure;
providing a receiver according to claim 1, configured and arranged to measure movement of the receiver after mounting;
mechanically mounting a receiver at an Rx location to a second suitable structure, wherein the transmitter and receiver are separated by a communication channel;

measuring a degree of predicted misalignment of the transmitter using the movement measurements of the transmitter; and measuring a degree of predicted misalignment of the receiver using the movement measurements of the receiver.

12. A communication system comprising:

an optical transmitter, configured and arranged to produce at least one first optical communications beam and at least one first optical alignment beam; and one or more communication receivers according to claim 1, configured and arranged to receive at least a portion of the at least one first optical communications beam and/or of the at least one first optical alignment beam produced by the optical transmitter.

13. The optical communication receiver according to claim 1, wherein at least part of the transmitter directional data corresponds to one or more coordinates, associated with a location of the transmitter and/or one or more receivers, selected from the group comprising:

a geographic coordinate, a longitude, a latitude, a radio-navigation co-ordinate, a satellite-based co-ordinate, a GLONASS co-ordinate, a Galileo co-ordinate, a Bei-Dou co-ordinate, a NAVIC, a QZSS co-ordinate, a WiFi network ID, a mobile phone cell tower ID, a radio beacon, a Bluetooth beacon, or any combination thereof.

14. The optical communication receiver according to claim 1, wherein wherein at least part of the transmitter directional data corresponds to one or more parameters selected from the group comprising:

an optical configuration parameter for the transmitter, a configuration parameter for a variable optical element comprised in the transmitter, atmospheric data associated with a location of the transmitter, positional and/or movement data from a positional sensor associated with a location of the transmitter, atmospheric data associated with a location through which the communication channel passes, an optical configuration parameter for a receiver, a configuration parameter for a variable optical element comprised in a receiver, atmospheric data associated with a location of a receiver, positional and/or movement data from a positional sensor associated with a location of a receiver, or any combination thereof.

15. The optical communication receiver according to claim 1, wherein the optical communication receiver further comprises:

one or more variable optical elements, configured and arranged to vary one or more directional properties of the at least one first optical communications beam and/or of the at least one first optical alignment beam upon receipt of one or more configuration parameters;

wherein the receiver directional controller is further configured and arranged to convert the transmitter directional data to one or more optical configuration parameters, and to provide the one or more configuration parameters to the one or more variable optical elements.

16. The optical communication receiver according to claim 15, wherein the one or more variable optical elements are comprised in an optical aligner, configured and arranged to vary one or more directional properties of the at least one first optical communications beam and/or of the at least one first optical alignment beam.

17. The optical communication receiver according to claim 1, wherein the optical communication receiver is configured and arranged to receive at least one first optical communications beam and/or at least one first optical alignment beam having a central wavelength in the range of 1260 to 1360 nm, or in the range of 1530 to 1565 nm, or in the range 1565 to 1625 nm.

18. The optical communication receiver according to claim 1, wherein the optical communication receiver is configured and arranged to receive the at least one first optical communications beam and/or the at least one first optical alignment beam through a communication channel, the communication channel comprising one or more of:

space sections, atmospheric sections, or any combination thereof, suitable for use by a Free Space Optic (FSO) or Free Space Photonics (FSP) system.

* * * * *